(12) United States Patent
Staniulis, Jr.

(10) Patent No.: US 10,900,724 B1
(45) Date of Patent: Jan. 26, 2021

(54) INDIRECT AND DIRECT EVAPORATIVE COOLING SYSTEM

(71) Applicant: Anthony Staniulis, Jr., Las Vegas, NV (US)

(72) Inventor: Anthony Staniulis, Jr., Las Vegas, NV (US)

( * ) Notice: Subject to any disclaimer, the term of this patent is extended or adjusted under 35 U.S.C. 154(b) by 0 days.

(21) Appl. No.: 16/847,643

(22) Filed: Apr. 13, 2020

(51) Int. Cl.
*F28F 25/00* (2006.01)
*F28F 25/12* (2006.01)
*F28F 27/00* (2006.01)
*F28F 25/04* (2006.01)

(52) U.S. Cl.
CPC .............. *F28F 25/12* (2013.01); *F28F 25/04* (2013.01); *F28F 27/003* (2013.01)

(58) Field of Classification Search
CPC ....... F24F 5/0035; F24F 13/20; F25B 39/028; F28F 25/04; F28F 25/12; F28F 27/003
USPC ........................... 261/106, 152, 153, DIG. 11
See application file for complete search history.

(56) References Cited

U.S. PATENT DOCUMENTS

| | | | | |
|---|---|---|---|---|
| 2,725,729 A * | 12/1955 | Mills | ..................... | F24F 1/0007 62/310 |
| 3,304,069 A * | 2/1967 | Palmer, Sr. | ............... | F24F 6/04 261/94 |
| 3,739,556 A * | 6/1973 | Waters | ...................... | F28C 1/02 96/356 |
| 4,112,027 A * | 9/1978 | Cates | ......................... | F28C 1/14 165/900 |
| 4,419,300 A * | 12/1983 | VanNess | .................. | B01D 1/00 261/106 |
| 4,774,030 A * | 9/1988 | Kinkel | ...................... | F24F 6/04 261/105 |
| 4,827,733 A * | 5/1989 | Dinh | ....................... | F24F 1/022 62/119 |
| 5,226,293 A * | 7/1993 | Brock | ..................... | F24F 13/08 261/106 |
| 6,931,883 B2 * | 8/2005 | Bourne | ................. | F24F 5/0035 62/314 |
| 7,296,785 B2 * | 11/2007 | Hayden | ................. | B05B 17/085 261/105 |
| 7,862,011 B2 * | 1/2011 | Kammerzell | ......... | F24F 5/0035 261/106 |
| 2005/0001334 A1 * | 1/2005 | Roberts | .................... | F24F 13/20 261/36.1 |
| 2017/0227243 A1 * | 8/2017 | Thomas | .................... | F24F 6/00 |

* cited by examiner

*Primary Examiner* — Charles S Bushey
(74) *Attorney, Agent, or Firm* — Bayramoglu Law Offices LLC

(57) ABSTRACT

A cooling tower includes at least one cooling fan, a cooling tower fan, at least one indirect heat exchanger, a heat exchanger coil and a direct heat exchanger. All inner surfaces of the cooling tower, except for the indirect heat exchanger, are made from and/or include a non-porous material. The non-porous material is high-density polyethylene. The cooling tower is part of an indirect-direct evaporative cooling system and supplies cool air to a building structure or areas that desire cooling.

19 Claims, 18 Drawing Sheets

INDIRECT AND DIRECT EVAPORATIVE COOLING SYSTEM

TECHNICAL FIELD

The present disclosure relates to an evaporative cooling system which includes a cooling tower. More specifically, the present disclosure has all internal surfaces of the cooling tower such as the internal walls of the cooling tower and outer surfaces of other apparatus inside of the cooling tower within the evaporative cooling system made from a non-porous material and/or comprising a non-porous material.

BACKGROUND

Evaporative coolers provide cool air by converting hot dry air through an evaporative process. This evaporative process works by forcing warm air through fluidly moist heat exchange pads to remove the hot dry air's heat. A supply air stream which is cooled enters into a desired space. A more specific type of evaporative cooling process is a two-stage indirect-direct evaporative cooling system, which offers good cooling effectiveness and expands the regions of the world where evaporative cooling can be used.

Direct evaporative cooling cools air by evaporating water which increases the moisture content of the air. One goal of the direct evaporative cooling system is to have the supply air temperature leaving the evaporative cooler approach the outdoor wet-bulb temperature. Direct evaporative cooling systems are suitable for hot and dry climates where the design wet-bulb temperature is 68° F. or lower. In other climates, outdoor humidity levels are too high to allow for sufficient cooling.

Indirect evaporative cooling uses a heat exchanger to remove heat from a supply air stream without adding moisture.

When indirect cooling is combined with direct evaporative cooling, the supply air is cooled and additionally some moisture is added to the supply air. This combination of indirect cooling and direct evaporative cooling is known as a two-stage system which is referred to in the art and in the industry as indirect-direct or indirect-direct evaporative cooling (IDEC) systems and can meet the cooling load for industrial and commercial buildings in arid to semi-arid climates. IDEC systems provide cooler supply air at a lower relative humidity than direct evaporative cooling units. First, the indirect stage cools the supply air without increasing humidity. Since the air is cooled, the air has a reduced capacity to hold moisture. Next, the supply air is then passed through a direct cooling stage, which cools the air further while adding additional moisture. IDEC systems typically cool air to a temperature slightly below the outdoor air wet-bulb temperature.

IDEC systems used in arid climates (with a design wet-bulb temperature of 66° F. or lower) have a power consumption typically lower than a compressor-based cooling system. However, in more humid climates indirect-direct systems have less power reduction and energy savings than other cooling solutions.

Since the internal surfaces of conventional cooling towers are made from metal, in the above the evaporative cooling systems, these metal inside surfaces of the conventional cooling towers rapidly form mold, mildew, calcination and deposits of metals due to the cooling towers metal inner surface being contacted with water. These deposits of mold, mildew, calcination and metals reduce the cooling efficiency of the cooling system and reduces the useful life of the cooling system overtime since the formations of mold, mildew, calcination and metals onto the inner surface of the cooling tower reduce the effective cooling passage flow areas within the heat exchangers and form a thermal barrier layer within the cooling passages of the heat exchangers and therefore reduces the cooling efficiency of the heat exchangers and further increases the operational cost of the cooling system by having to input more electrical energy such as more power to the pumps and fans in order to run the pumps and fans at higher speeds to compensate for the reduced cooling efficiency caused by the buildup of mold, mildew, calcination and deposits of metals onto the inner surface of the cooling tower. Furthermore, very frequent maintenance and cleaning of the conventional cooling towers are required which adds very high costs to the operator of the cooling system.

Therefore, there is a need to provide an energy saving, efficient and lost cost and maintenance cooling tower and evaporative cooling system.

The present disclosure and invention has solved the above problem of mold, mildew, calcination and deposits of metals forming on the inner surface of the cooling tower by having all inside surfaces of the cooling tower, except for the surfaces of the indirect heat exchanger pads, made from and/or comprise a non-porous material such as high-density polyethylene (HDPE) and not made from metal. Therefore, the present disclosure includes all inside surfaces of a cooling tower, except for the surfaces of the indirect heat exchanger pads, made from and/or comprise a non-porous material such as high-density polyethylene (HDPE) which prevents the formation of mold, mildew, calcination and deposits of metals on the inner surfaces of the cooling tower and therefore increases the cooling efficiency and the operational life of the cooling tower and the evaporative cooling system as well as lowers the cost of operating the cooling tower and evaporative cooling system by reducing the consumption of power to run the pumps, fans and other system components and by eliminating frequent cleaning and maintenance.

SUMMARY

All inside surfaces, except for the surfaces of the indirect heat exchanger pads, of the cooling tower, are made from a non-porous material and not made from metal. The non-porous surfaces can be made by known methods of manufacturing as well as 3-D printing, coating or molding. Preferably, all inside surfaces of the cooling tower, except for the surfaces of the indirect heat exchanger pads, are made from and/or comprise high-density polyethylene (HDPE) in order to solve the problem of mold, mildew, calcination and deposits of metals forming on the inner surface of the cooling tower because if all inside surfaces of the cooling tower, except for the surfaces of the indirect heat exchanger pads, are made from and/or comprise HDPE then mold, mildew, calcination and deposits of metals including alkaline earth metals and/or other metals are prevented from forming on the inner surfaces of the cooling tower and this prevention of mold, mildew, calcination and deposits of metals increases the cooling efficiency during the operational life of the cooling tower and the evaporative cooling system.

High-density polyethylene (HDPE) or polyethylene high-density (PEHD) is a thermoplastic polymer produced from the monomer ethylene. One example of HPDE which is used is a Marine Grade HDPE such as SEABOARD™ or STARBOARD™ made by Ridout Plastics Co. Inc. The Marine Grade HDPE can be the color of polar white or any other known color. The Marine grade HDPE has superior scratch and impact resistance, high stiffness, is ultraviolet (UV) stabilized, will not delaminate, chip, rot, or swell, is easy to machine with standard tooling, is a low energy material and has no moisture absorption, is easy to clean and is FDA and USDA approved with UV additive. The thickness used on all surfaces of the cooling tower of the Marine Grade HDPE is in the range of one sixteenth of an inch to six inches. The above characteristics and benefits are needed and required to make the disclosed cooling tower prevent the formation of mold, mildew, calcination and deposits of metals, prevent thermal warping and increase the cooling efficiency during the operational life of the cooling tower and the evaporative cooling system.

Polyesters are formed by polyalkylene terephthalates having alkyl groups or radicals comprising 2 to 10 carbon atoms and polyalkylene terephthalates having alkyl groups or radicals containing 2 to 10 carbon atoms which are interrupted by 1 or 2 —O—. Further, polyesters can be polyalkylene terephthalates having 5 alkyl groups or radicals containing 2 to 4 carbon atoms.

Examples of polyolefin materials are polyethylenes (PE) which include high density polyethylene (HDPE) having a density greater than 0.944 g/cm$^3$, medium density polyethylene (MDPE) having a density in the range of 0.926 g/cm$^3$ to 0.940 g/cm$^3$, low density polyethylene (LDPE) having a density in the range of 0.910 g/cm$^3$ to 0.925 g/cm$^3$, in the form of nonoriented sheets (PE sheet) or monoaxially or biaxially oriented sheets (oPE sheet), polypropylenes (PP), such as axially or biaxially oriented polypropylene (oPP sheet) or cast polypropylene (cPP sheet), amorphous or crystalline polypropylene or blends thereof or atactic or isotactic polypropylene or blends thereof, poly(l-butene), poly(3-methylbutene), poly(4 methylpentene) and copolymers thereof, then polyethylene with vinyl acetate, vinyl alcohol or acrylic acid, such as, for example, ionomer resins, such as copolymers of ethylene, of acrylic acid, of methacrylic acid, of acrylic esters, tetrafluoroethylene or polypropylene, in addition random copolymers, block copolymers or olefin polymer/elastomer blends. The polyolefin materials can also comprise cycloolefins as monomer of a homopolymer or of copolymers.

The disclosed invention uses on all inside surfaces of the cooling tower, except for the surfaces of the indirect heat exchanger pads, high-density polyethylenes. However, polypropylenes and ionomers having the density of the range of HPDE, may be used on all inside surfaces of the cooling tower, except for the surfaces of the indirect heat exchanger pads.

Examples of polyamides (PA) for the plastics sheets are composed, for example, of polyamide 6, ε-caprolactam homopolymer (polycaprolactam); polyamide 11; polyamide 12, ω-lauryllactam homopolymer (polylauryllactam); polyamide 6,6, homopolycondensate of hexamethylenediamine and of adipic acid (poly(hexamethylene adipamide)); polyamide 6,10, homopolycondensate of hexamethylenediamine and of sebacic acid (poly(hexamethylene sebacamide)); polyamide 6,12, homopolycondensate of hexamethylenediamine and of dodecanedioic acid (poly(hexamethylene dodecanamide)) or polyamide 6-3-T, homopolycondensate of trimethylhexamethylenediamine and of terephthalic acid (poly(trimethylhexamethylene terephthalamide)), and blends thereof. The polyamide sheets are drawn monoaxially or biaxially (oPA).

One of many benefits of HDPE is from HDPE's inherent malleability such a being meltable and moldable as well as being a low-cost material. HDPE has a high melting point which is in the range of 239° F.-275° F. and therefore, HDPE remains rigid at very high temperatures. However, once HDPE reaches its melting point, the HDPE material can be quickly and efficiently molded for use. Moreover, HDPE can be shaped and/or made into any desired geometric or polygonal shape by using, for example, a 3-D printer.

Additionally, HDPE is corrosion resistance. HDPE resists mold, mildew and rotting, making HDPE the ideal material for being used in cooling tower's which are exposed to water due to the HDPE resisting mold and mildew which results in low maintenance and very low frequent cleaning of the cooling tower as compared to conventional cooling towers. HDPE is long-lasting and weather-resistant and can be sterilized by boiling. Additionally, HDPE can withstand most strong mineral acids and bases and has excellent resistance to naturally occurring chemicals. Moreover, the material of HDPE is non-porous and virtually impervious to most common chemicals, water, solvents, acids, detergents, and cleaning fluids. Therefore, calcination and metals from water are prevented from forming on the surface of HDPE.

HDPE has a large strength to density ratio. HDPE's linear structure means the material has little branching, which offers HDPE stronger intermolecular forces and tensile strength than MDPE and LDPE. HDPE plastic is easily recyclable and therefore reduces non-biodegradable waste from being introduced into landfills and helps reduce plastic production.

On example of a cooling system which the cooling tower can be used is disclosed below. At least one indirect heat exchanger pad comprise a plurality of heat exchanger passages and by the use of at least one cooling tower fan, ambient hot air passes through the plurality of heat exchanger passages and a fluid from above the at least one indirect heat exchanger pad flows down and over the surfaces of the at least one indirect heat exchanger pad, including the plurality of heat exchanger passages, and makes direct contact with the ambient hot air. Therefore, the apparatus has cooled the ambient hot air. The now cooled ambient or outside air then flows through at least one outlet of the cooling tower.

The cooling tower fan is a motorized impeller variable frequency drive (VFD) fan. Therefore, the outside air is pulled through the at least one indirect heat exchanger pad from outside of the cooling tower to inside the cooling tower. The fluid, which has now flowed through the plurality of heat exchanger passages of the at least one indirect heat exchanger pad, exits the plurality of heat exchanger passages and is collected in a bottom portion of the cooling tower. The bottom portion of the cooling tower has a slanted or curved shape which enables the collected fluid exiting the at least one indirect heat exchanger pad to flow to a middle section of the bottom portion of the cooling tower where the collected fluid flows through an opening in the middle section where this collected fluid is pumped via a circulating pump(s) to an indirect cooling heat exchanger such as a coil type of heat exchanger.

A plurality of conduit apertures are located within a bottom of a conduit, where the conduit is located above the bottom portion of the cooling tower so as to provide automatic cleaning of the cooling tower.

A dump or drain valve and a filter are fluidly connected to the opening in the middle section and is located upstream from the circulating pump or pumps in order to remove dirt or sediment from the collected fluid which has flowed through the opening in the middle section of the bottom portion of the cooling tower. The filter can be a Y-strainer type filter or any type of known filter. The type of values used can be any known type of valve.

A drain is attached to the bottom portion of the cooling tower and is in fluid connection with the collected fluid in order to remove and/or drain the collected fluid from the bottom portion of the cooling tower at any desired time.

A door panel is located on one side and/or on a bottom of the cooling tower in order to easily access the circulating pump or pumps and/or any other apparatus.

The circulating pump(s) is/are a seal less magnetically drive pump and also is a variable frequency drive (VFD) pump. The circulating pump(s) can operate in the range of one to two amps, or more than two amps if necessary, which dramatically reduces operating costs and still meets the cooling systems load requirement. All of the inner surfaces of the fluid passages through which the collected fluid flows through the circulating pump(s) are not metal in order to solve the problem of calcium, alkaline earth metals and/or other metals forming on the surface of the fluid passages. Therefore, all of the inner surfaces of the fluid passages in the circulating pump(s) which the collected fluid flows through are made of a non-porous material such as high-density polyethylene (HDPE) because HDPE resists mold, mildew and well as prevents calcination and the formation of metal deposits. However, the circulating pump(s) can be any pump which has inner surfaces of the fluid passages in the circulating pump(s) being made of a non-porous material such as high-density polyethylene (HDPE).

Since the cooling tower fan is a variable frequency drive (VFD) fan and the circulating pump is a variable frequency drive (VFD) pump, the cooling tower fan and the circulating pump(s) can be operated in conjunction with each other and at low speeds and low amperage in order to satisfy the requirements of the cooling capacity given an outside air temperature in order to increase the cooling towers and cooling systems efficiency because operating the cooling tower fan and/or the circulating pump(s) at low speeds lowers air velocity and fluid pump flow and therefore increases the time (i.e. dwell time) the air and fluid are within the heat exchanges which increases the heat transfer effectiveness significantly while reducing the electric power to the cooling tower fan and/or the circulating pump(s).

Additionally, the present invention attaches non-porous boards on the front and back sides of the indirect heat exchanger pads at both the upper and lower ends of the indirect heat exchanger pads. Non-porous supports are attached to walls of the cooling tower such that the non-porous boards, which are attached at the lower ends of the indirect heat exchanger pads, are supported by the non-porous supports. For example, the non-porous supports have a groove and the non-porous boards are located within the grooves of the supports such that a space is formed between the bottom surface of the indirect heat exchanger pads and the bottom portion of the cooling tower. The non-porous boards are removably fastened to the indirect heat exchanger pads for the purpose of being able to easily remove the indirect heat exchanger pads from the cooling tower in order to perform cleaning and/or maintenance or to replace the indirect heat exchanger pads. The non-porous supports and non-porous boards are made from and/or comprise high-density polyethylene. Furthermore, the non-porous boards can be rectangular shaped, any other geometrical or polygonal shape and/or can have any aerodynamic shape in order create a smooth or laminar flow to any air contacting the non-porous boards.

Additionally, a lower supporting apparatus is attached to the surface of the indirect heat exchanger pads which solves the problem of preventing the fluid which has flowed through the plurality of heat exchanger passages of the indirect heat exchanger pads from splashing or flowing out from the cooling tower, which reduces the loss and use of water in the cooling system. The lower supporting apparatus comprises a non-porous backboard and a non-porous drain board, where the non-porous drain board makes an angle in the range of five to twenty-two degrees with a horizontal line (i.e. a flat/non-vertical line such as the x-axis in the conventional x-y coordinate system).

A filter or grate is attached to an outer surface of the cooling tower. A distance between an inner surface of the filter or grate and a surface of the indirect heat exchanger pad is in the range of 4.0 to 6.0 inches, 4.5 to 5.5 inches, 4.8 to 5.2 inches, or 4.9 to 5.1 inches. The distance between the inner surface of the filter or grate is critical because the distance solves two interconnected problems. First, the distance solves the prevention of calcination or the prevention of other metals collecting on the surface of the indirect heat exchanger pads by having ambient or outside side flowing uniformly (i.e. the second solved problem) through the entire surface area of the indirect heat exchanger pads.

At a top portion of the at least one indirect heat exchanger pad, a distribution apparatus is positioned above the top portion of the at least one indirect heat exchanger pad and a fluid line is fluidly connected to and pressurized by the circulating pump. The fluid line is fluidly connected to the distribution apparatus from inside the cooling tower, so the fluid is not in direct contact with the sun and is prevented from being heated by the direct rays or other hot elements from outside of the cooling tower. The distribution apparatus can have an open bottom and a distribution plate fastened to the distribution apparatus which has a plurality of holes and the plurality of holes are arranged in a staggered arrangement or random arrangement so as to evenly allow the pressurized fluid to flow through the plurality of holes onto the outer surface of the at least one indirect heat exchanger pad. However, the distribution apparatus can have a bottom surface comprising a plurality of holes therein, which allows for not having a distribution plate, and the plurality of holes are arranged in a staggered arrangement or random arrangement so as to evenly allow the pressurized fluid to flow through the plurality of holes onto the outer surface of the at least one indirect heat exchanger pad. The distribution apparatus is in the same shape as the top portion of the at least one indirect heat exchanger pad in order to fully coat all surfaces of the at least one indirect heat exchanger pad with a fluid. Therefore, the distribution apparatus is in the general shape of a rectangle where the sides and top of the distribution apparatus form a fluid tight apparatus and the bottom of the distribution apparatus allows a fluid to pass therethrough. At least one side of the distribution apparatus has a fluid inlet for the fluid pumped via the circulating pump(s) to enter the distribution apparatus. Therefore, the top and all sides of the distribution apparatus, except for the portion of the side which has the fluid inlet, do not allow passage of a fluid (i.e. are closed to atmospheric air).

By having the fluid being introduced into the distribution apparatus under pressure (i.e. more than atmospheric pressure) by the circulating pump, as opposed to having the fluid operating under atmospheric pressure solves the problem of being able to either increase or decrease the flow rate over the outer surfaces of the at least one indirect heat exchanger pad. Furthermore, since the fluid is pressurized by the circulating pump(s), this has allowed Applicant to create hole sizes within the distribution apparatus such that the fluid level within the distribution apparatus stays at a constant level and/or maintains a level such that the outer surfaces of the at least one indirect heat exchanger pad are always fully coated or saturated during use. The holes can be round, circular or any geometric or polygon shape. The size of the holes can have a diameter of one sixteenth of an inch to four inches. However, the hole diameters can be smaller and/or larger than one sixteenth of an inch or four inches. If the opening of the holes is not circular in shape, then the holes opening can be one sixteenth of an inch to four inches or can be larger or smaller than one sixteenth of an inch or four inches. The holes may all have the same size or may have different sizes in order to create hole sizes within the distribution apparatus such that the fluid level within the distribution apparatus stays at a constant level and/or maintains a level such that the outer surfaces of the at least one indirect heat exchanger pad are always fully coated or saturated during use.

An ultrasonic sensor and relay are located above the bottom portion of the cooling tower, attached to a non-porous device and are inserted within a protective container. The ultrasonic sensor and relay senses and determines the collect fluid level within the bottom portion of the cooling tower and send signals to a relay in the cooling system and to a fill valve, which is fluidly connected to the coil heat exchanger. An ultrasonic sensor and relay send signals to the fill valve and/or chilled water valve such that the fill valve and/or chilled water valve operates such in a manner to add small amounts of water into the bottom portion of the cooling tower, keeping the temperature of the collect fluid level within the bottom portion of the cooling tower at a constant temperature by not letting the collect fluid level within the bottom portion of the cooling tower become below a determine level. The addition of water in small amounts does not change the temperature of the collected fluid and solves the problem of increasing the temperature of the collected water by adding a large volume of water to the collect fluid level within the bottom portion of the cooling tower which does and will increase the temperature of the collected fluid and therefore reduces the cooling efficiency of the cooling tower and the cooling system.

The non-porous device is attached to an inner wall of the cooling tower. The protective container is placed on the bottom portion of the cooling tower and has a flow passage located a lower part of the protective container in order to allow the collected fluid to flow into and out of the flow passage. The ultrasonic sensor and relay are inserted in (i.e. located within) the protective container.

A fluid channel device is located on the bottom portion of the cooling tower and is connected to the bottom portion of the cooling tower via a fastener or fasteners. The fluid channel device is positioned on the bottom portion of the cooling tower such that the opening in the middle section of the bottom portion of the cooling tower is covered by the fluid channel device. Additionally, the fluid channel device has a plurality of channels spaced along the length of the fluid channel device. The channels may have an elongated shape, a circular shape or any geometric or polygonal shape such that the collected fluid flows into the plurality of channels. The shape of the channels is designed such that the height of the channels allows the coldest lower level portion of the collected fluid to flow therethrough and is designed such that when the circulating pump is operating at maximum power and flow rate, the collected fluid flows through the plurality of channels at a flow rate such that the indirect heat exchanger pads are being maintained fully saturated (i.e. the outside surface of the indirect heat exchanger pads are not devoid of a fluid) when the cooling tower and system are operational. The height and/or shape of the channels may all be same or some channels may have the same shape and other channels may have a different shape such that when the circulating pump(s) is/are operating at maximum power and flow rate, the collected fluid flows through the plurality of channels at a flow rate such that the at least one indirect heat exchanger pad is/are being maintained fully saturated. Also, the height of the channels may all be the same or some channels may have the same height and other channels may have a different height such that when the circulating pump(s) is/are operating at maximum power and flow rate, the collected fluid flows through the plurality of channels at a flow rate such that the at least one indirect heat exchanger pad is/are being maintained fully saturated. The height of the channels is the maximum distance between the bottom portion of the cooling tower to the void of material in fluid channel device which forms the channel.

Also, the evaporative cooling system has ambient air or outside air being pulled into an air inlet/inlet apparatus by using variable frequency drive (VFD) fans and the ambient air or outside air then flows through an indirect heat exchanger, then through a direct heat exchanger where the ambient air or outside air, has now cooled from the indirect and direct heat exchangers and then this cooled air flows to the desired space which is to be cooled. Additionally, any ambient air inlet can comprise louvers and/or movable supports such that the inlet can be moved using wheels in order to perform maintenance.

BRIEF DESCRIPTION OF THE DRAWINGS

In order to more clearly illustrate the embodiments of the present disclosure, a brief description of the drawings is given below. The following drawings are only illustrative of some of the embodiments of the present disclosure and for a person of ordinary skill in the art, other drawings or embodiments may be obtained from these drawings without inventive effort.

DETAILED DESCRIPTION

The technical solutions of the present disclosure will be clearly and completely described below with reference to the drawings. The embodiments described are only some of the embodiments of the present disclosure, rather than all of the embodiments. All other embodiments that are obtained by a person of ordinary skill in the art on the basis of the embodiments of the present disclosure without inventive effort shall be covered by the protective scope of the present disclosure.

In the description of the present disclosure, it is to be noted that the orientational or positional relation denoted by the terms such as "center", "upper", "lower", "left", "right", "vertical", "horizontal", "inner" and "outer" is based on the orientation or position relationship indicated by the figures, which only serves to facilitate describing the present disclosure and simplify the description, rather than indicating or suggesting that the device or element referred to must have a particular orientation, or is constructed or operated in a particular orientation, and therefore cannot be construed as a limitation on the present disclosure. In addition, the terms "first", "second" and "third" merely serve the purpose of description and should not be understood as an indication or implication of relative importance.

In the description of the present disclosure, it should be noted that unless otherwise explicitly specified and defined, the terms "install", "link", "attached" and "connect" shall be understood in the broadest sense, which may, for example, refer to fixed connection, detachable connection or integral connection; may refer to mechanical connection or electrical connection; may refer to direct connection or indirect connection by means of an intermediate medium; and may refer to communication between two elements. A person of ordinary skill in the art would understand the specific meaning of the terms in the present disclosure according to specific situations.

FIGS. 1-18 illustrate the present invention of an indirect-direct evaporative cooling (IDEC) system including a cooling tower 100.

The below disclosed cooling tower and cooling system uses one hundred percent fresh ambient or outside air as the air supplied to a building or space which desires cool air. However, depending on the requirement for cooling, preconditioned air may be combined with the ambient or outside air for the air to be used for cooling a building or space.

Figure 1:
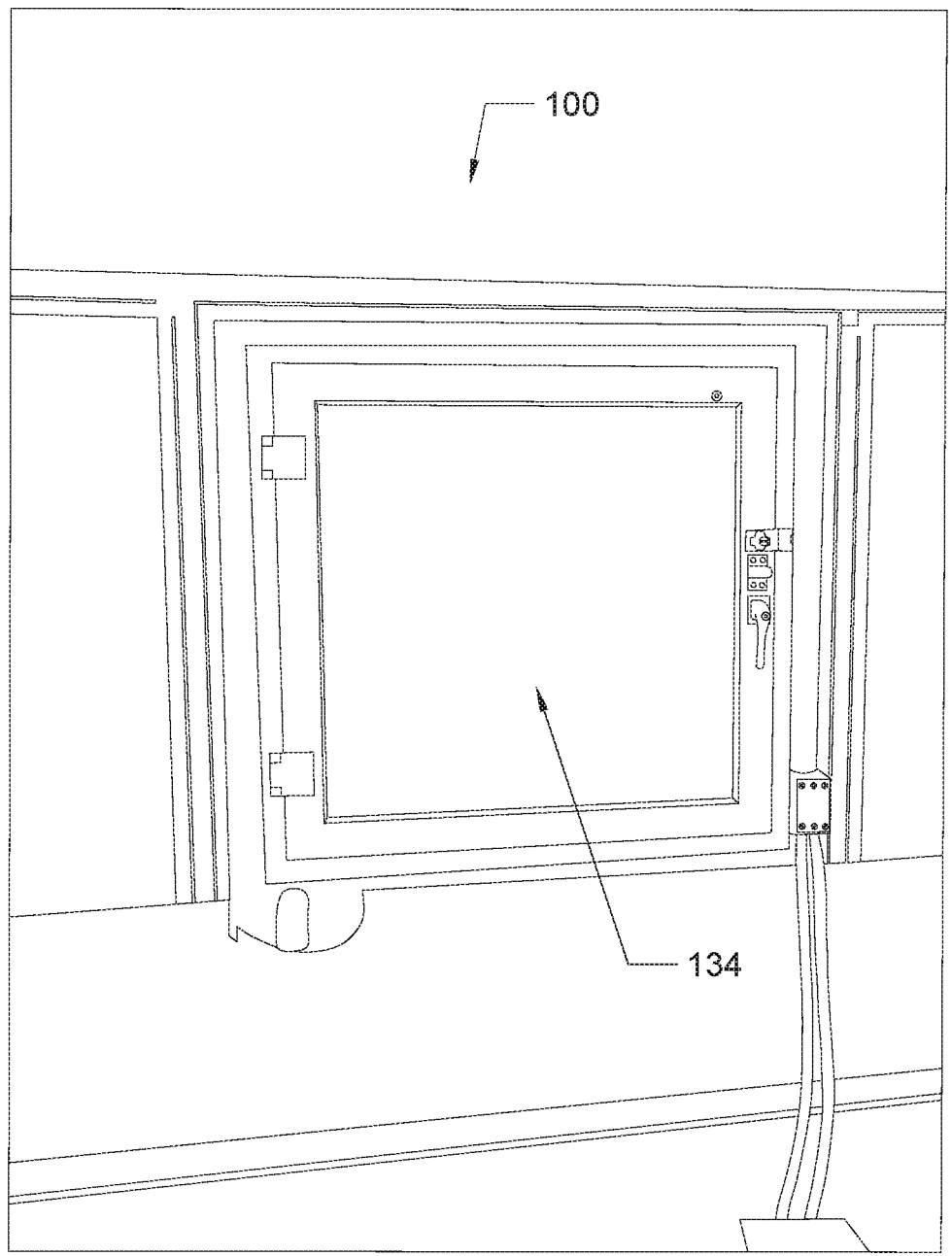
FIG. 1 is a schematic external view of a cooling tower.
Figure 2:
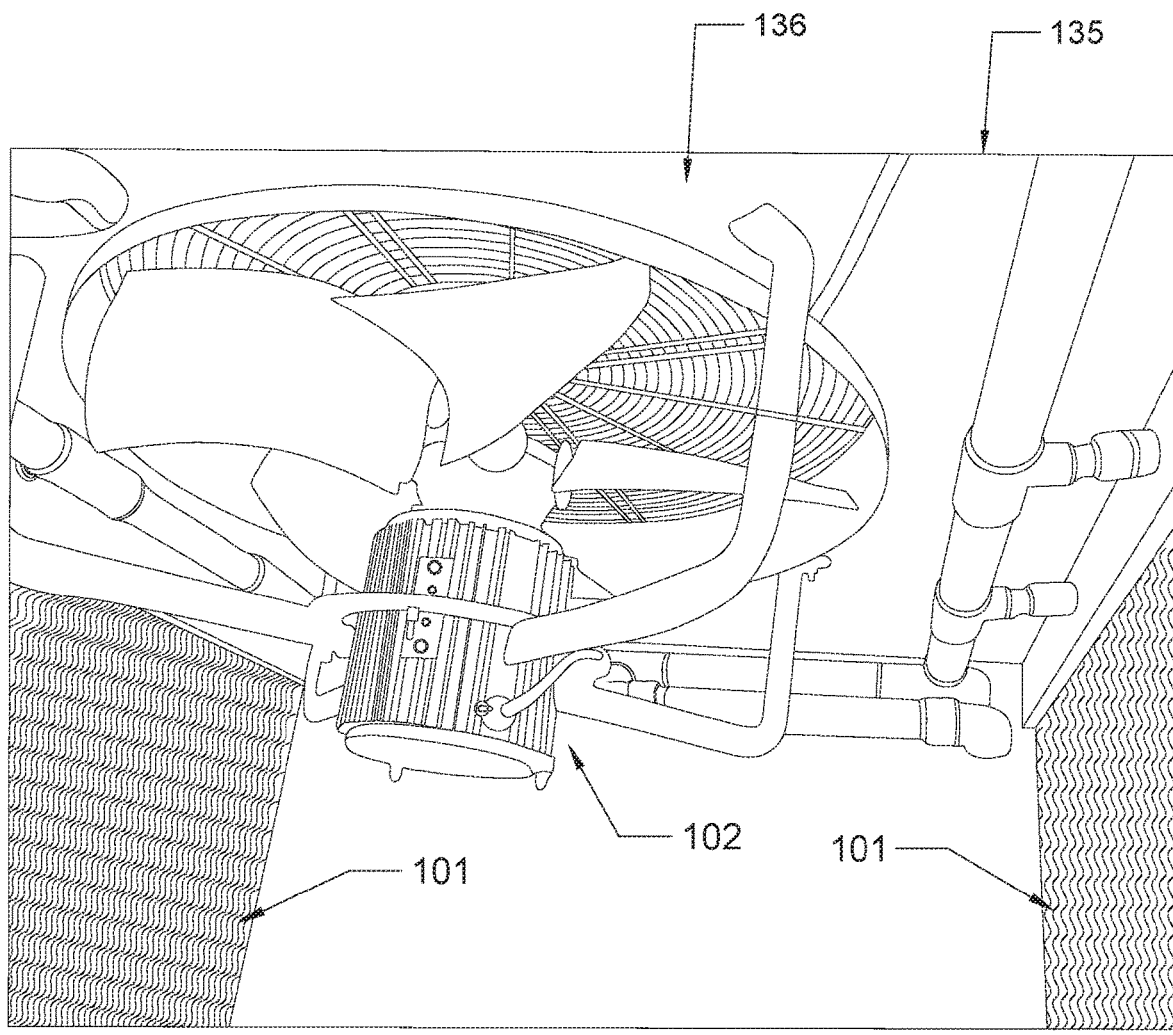
FIG. 2 is a schematic internal view of the cooling tower.
Figure 3:
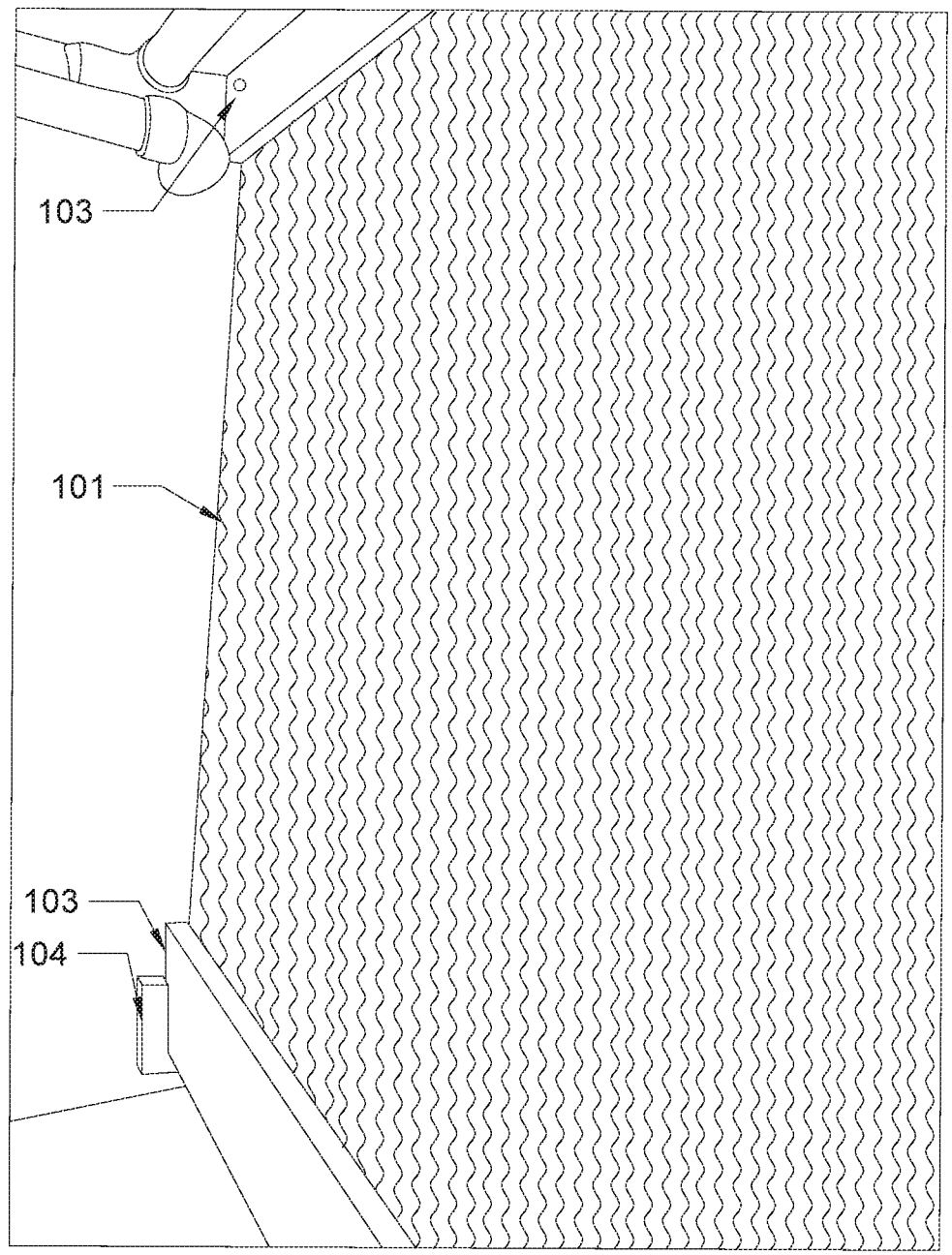
FIG. 3 is a schematic perspective view of an indirect cooling pad in the cooling tower.

The cooling tower 100 as shown in FIG. 1, FIG. 14, FIG. 17 and FIG. 18 is in the general shape of a square or is box shaped. The cooling tower 100 may have a height in the range of two feet to twelve feet; a width in the range of two feet to twelve feet; and a depth in the range of two feet to twelve feet. As needed, the above height, width and depth ranges of the cooling tower 100 may be smaller and/or larger than the above disclosed ranges in order to meet design and cooling demands. However, the shape of the cooling tower 100 can be any geometrical or polygonal shape. As shown in FIG. 1, FIG. 2, FIG. 4, FIG. 14 and FIG. 17 and FIG. 18, the cooling tower is comprised of a front side which has an access door 134, a top 135 which has an aperture 136, a bottom portion 105, indirect heat exchanger pads 101, where each indirect heat exchanger pad 101 is located on each side (i.e. on a left side and a right side of the of the cooling tower 100; on each side of the access door 134 as shown in FIG. 1) and a back side which is opposite the front side which has the access door 134. Each indirect heat exchanger pad 101 can have the general shape of a rectangle. However, the shape of the indirect heat exchanger pads 101 can be any geometrical or polygonal shape. The indirect heat exchanger pads 101 may have a height in the range of two feet to twelve feet; a width in the range of two feet to twelve feet; and a depth in the range of two feet to twelve feet. As needed, the above height, width and depth ranges of the indirect heat exchanger pads 101 may be smaller and/or larger than the above disclosed ranges in order to meet design and cooling demands. Also, the quantity/number of the indirect heat exchanger pads 101 installed in the cooling tower 100 have be in the range of one to ten.

All inside/internal surfaces of the cooling tower, except for the surfaces of the indirect heat exchanger pads, such as the internal walls of the cooling tower and outer surfaces of other apparatus inside of the cooling tower within the evaporative cooling system are made from a non-porous material and/or comprising a non-porous material and not metal. Preferably, all inside surfaces of the cooling tower 100, except for the surfaces of the indirect heat exchanger pads, are made from and/or comprise high-density polyethylene (HDPE) in order to solve the problem of mold, mildew, calcination and deposits of metals forming on the inner surface of the cooling tower 100 because if all inside surfaces of the cooling tower 100, except for the surfaces of the indirect heat exchanger pads 101, are made from and/or comprise HDPE then mold, mildew, calcination and deposits of metals including alkaline earth metals and/or other metals are prevented from forming on the inner surfaces of the cooling tower 100 and this prevention of mold, mildew, calcination and deposits of metals increases the cooling efficiency during the operational life of the cooling tower 100 and the evaporative cooling system. The non-porous surfaces can be made by known methods of manufacturing as well as molding, coating or 3-D printing.

High-density polyethylene (HDPE) or polyethylene high-density (PEHD) is a thermoplastic polymer produced from the monomer ethylene. One example of HPDE which is used is a Marine Grade HDPE such as SEABOARD™ or STARBOARD™ made by Ridout Plastics Co. Inc. The Marine Grade HDPE can be the color of polar white or any other known color. The Marine grade HDPE has superior scratch and impact resistance, high stiffness, is ultraviolet (UV) stabilized, will not delaminate, chip, rot, or swell, is easy to machine with standard tooling, is a low energy material and has no moisture absorption, is easy to clean and is FDA and USDA approved with UV additive. The thickness used on all surfaces of the cooling tower of the Marine Grade HDPE is in the range of one sixteenth of an inch to six inches. The above characteristics and benefits are needed and required to make the disclosed cooling tower prevent the formation of mold, mildew, calcination and deposits of metals, prevent thermal warping and increase the cooling efficiency during the operational life of the cooling tower and the evaporative cooling system.

Polyesters are formed by polyalkylene terephthalates having alkyl groups or radicals comprising 2 to 10 carbon atoms and polyalkylene terephthalates having alkyl groups or radicals containing 2 to 10 carbon atoms which are interrupted by 1 or 2 —O—. Further, polyesters can be polyalkylene terephthalates having 5 alkyl groups or radicals containing 2 to 4 carbon atoms.

Examples of polyolefin materials are polyethylenes (PE) which include high density polyethylene (HDPE) having a density greater than 0.944 g/cm$^3$, medium density polyethylene (MDPE) having a density in the range of 0.926 g/cm$^3$ to 0.940 g/cm$^3$, low density polyethylene (LDPE) having a density in the range of 0.910 g/cm$^3$ to 0.925 g/cm$^3$, in the form of nonoriented sheets (PE sheet) or monoaxially or biaxially oriented sheets (oPE sheet), polypropylenes (PP), such as axially or biaxially oriented polypropylene (oPP sheet) or cast polypropylene (cPP sheet), amorphous or crystalline polypropylene or blends thereof or atactic or isotactic polypropylene or blends thereof, poly(1-butene), poly(3-methylbutene), poly(4 methylpentene) and copolymers thereof, then polyethylene with vinyl acetate, vinyl alcohol or acrylic acid, such as, for example, ionomer resins, such as copolymers of ethylene, of acrylic acid, of methacrylic acid, of acrylic esters, tetrafluoroethylene or polypropylene, in addition random copolymers, block copolymers or olefin polymer/elastomer blends. The polyolefin materials can also comprise cycloolefins as monomer of a homopolymer or of copolymers.

The disclosed invention uses on all inside surfaces of the cooling tower 100, except for the surfaces of the indirect heat exchanger pads 101, high-density polyethylenes. However, polypropylenes and ionomers having the density of the range of HPDE, may be used on all inside surfaces of the cooling tower 100, except for the surfaces of the indirect heat exchanger pads 101.

Examples of polyamides (PA) for the plastics sheets are composed, for example, of polyamide 6, ε-caprolactam homopolymer (polycaprolactam); polyamide 11; polyamide 12, ω-lauryllactam homopolymer (polylauryllactam); polyamide 6,6, homopolycondensate of hexamethylenediamine and of adipic acid (poly(hexamethylene adipamide)); polyamide 6,10, homopolycondensate of hexamethylenediamine and of sebacic acid (poly(hexamethylene sebacamide)); polyamide 6,12, homopolycondensate of hexamethylenediamine and of dodecanedioic acid (poly(hexamethylene dodecanamide)) or polyamide 6-3-T, homopolycondensate of trimethylhexamethylenediamine and of terephthalic acid (poly(trimethylhexamethylene terephthalamide)), and blends thereof. The polyamide sheets are drawn monoaxially or biaxially (oPA).

One of many benefits of HDPE is from HDPE's inherent malleability such a being meltable and moldable as well as being a low-cost material. HDPE has a high melting point which is in the range of 239° F.-275° F. and therefore, HDPE remains rigid at very high temperatures. However, once HDPE reaches its melting point, the HDPE material can be quickly and efficiently molded for use. Moreover, HDPE can be shaped and/or made into any desired geometric or polygonal shape by using, for example, a 3-D printer.

Additionally, HDPE is corrosion resistance. HDPE resists mold, mildew and rotting, making HDPE the ideal material for being used in the cooling tower 100, which is exposed to water due, to the HDPE resisting mold and mildew which results in low maintenance and less frequent cleaning of the cooling tower 100 and conventional metal and porous cooling towers. HDPE is long-lasting and weather-resistant and can be sterilized by boiling. Additionally, HDPE can withstand most strong mineral acids and bases and has excellent resistance to naturally occurring chemicals. Moreover, the material of HDPE is non-porous and virtually impervious to most common chemicals, water, solvents, acids, detergents, and cleaning fluids. Therefore, calcination and metals from water are prevented from forming on the surface of HDPE.

HDPE has a large strength to density ratio. HDPE's linear structure means the material has little branching, which offers HDPE stronger intermolecular forces and tensile strength than MDPE and LDPE. HDPE plastic is easily recyclable and therefore reduces non-biodegradable waste from being introduced into landfills and helps reduce plastic production.

On example of an evaporative cooling system which includes the cooling tower 100 can be used is disclosed below.

As shown in FIG. 1, FIG. 2, FIG. 3 and FIG. 14, ambient or outside is forced through each of the indirect heat exchanger pads 101 via the cooling tower fan 102 or a plurality of cooling fans and a cooling fluid such as water flows over outer surfaces of the indirect heat exchanger pads 101 which cools the hot ambient air and moist air exits the cooling tower 100 through aperture 136. The cooling tower fan 102 is a motorized impeller variable frequency drive (VFD) fan. Therefore, the outside air is pulled through the indirect heat exchanger pads 101 from outside of the cooling tower 100 to inside the cooling tower 100. The cooling fluid, such as water flows, which has now flowed over the outer surface of the indirect heat exchanger pads 101, exits the indirect heat exchanger pads 101 via the force of gravity and is collected in a bottom portion 105 of the cooling tower 100. As shown in FIGS. 3-7, the bottom portion 105 of the cooling tower 100 has a slanted or curved shape which enables the collected cooling fluid exiting the indirect heat exchanger pads 101 to flow to a middle section of the bottom portion 105 of the cooling tower 100 where the collected fluid flows through an opening 125 in the middle section where this collected fluid is pumped via a circulating pump 113 to a distribution apparatus 130 and/or an heat exchanger such as a heat exchanger coil.

Figure 12:
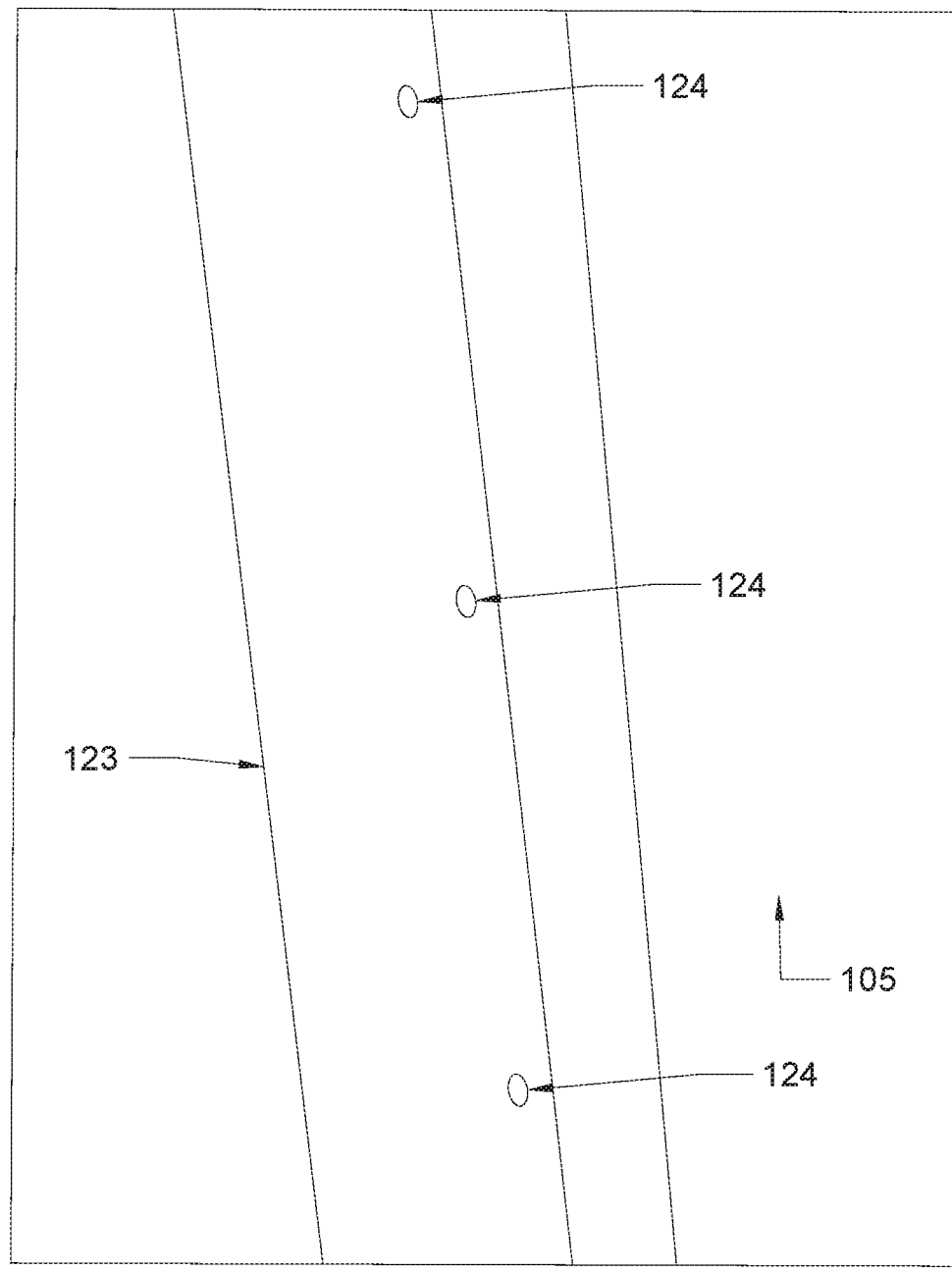
FIG. 12 is a bottom perspective view of a conduit with conduit apertures.

FIG. 12 illustrates a plurality of conduit apertures 124 are located within a bottom of a conduit 123, where the conduit 123 is located in above the bottom portion 105 of the cooling tower 100 which can be used to clean the cooling tower 100.

Figure 14:
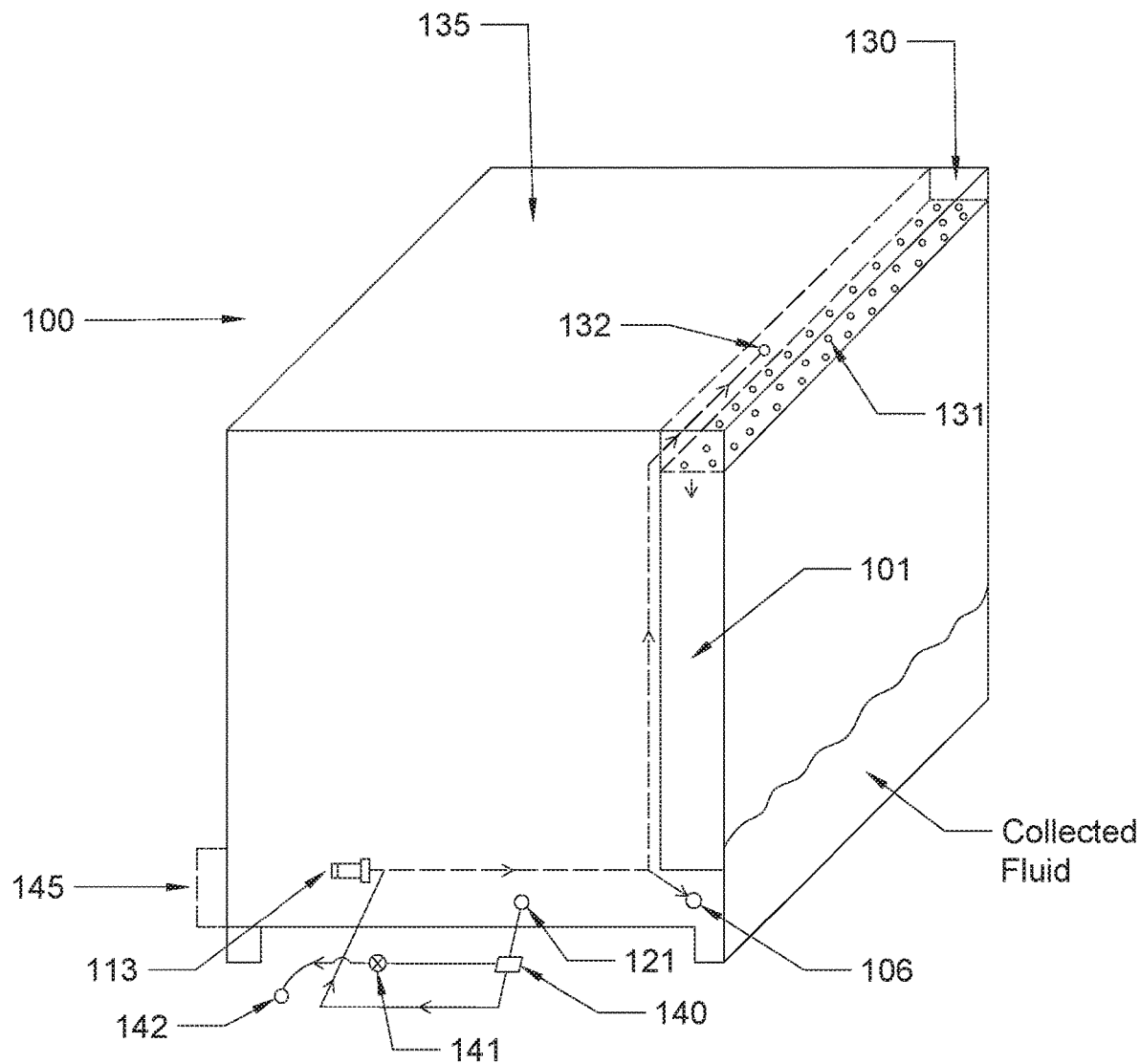
FIG. 14 is a perspective view of the cooling tower shown in the form of a box shape and illustrating only one side having an indirect heat exchanger pad with a distribution apparatus.

As illustrated in FIG. 14, a dump or drain valve 141 and a filter 140 are fluidly connected to the opening 125 in the middle section and is located upstream from the circulating pump 113 in order to remove dirt or sediment from the collected fluid which has flowed through the opening 125 in the middle section of the bottom portion 105 of the cooling tower 100. A drain 142 is located downstream of the dump or drain valve 141. The filter can be a Y-strainer type filter or any type of known filter. The type of value(s) used can be any known type of valve.

Figure 4:
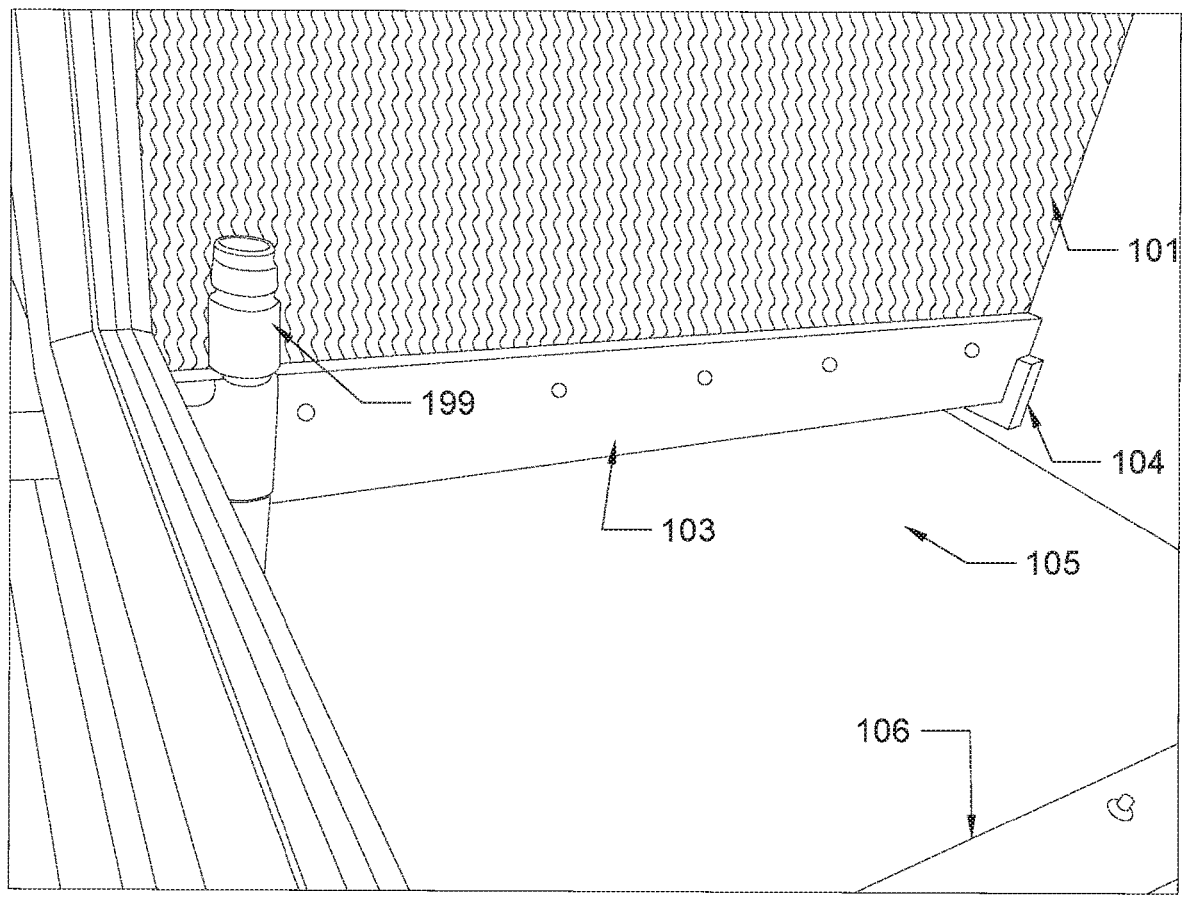
FIG. 4 is a schematic perspective view of a bottom portion inside the cooling tower.
Figure 5:
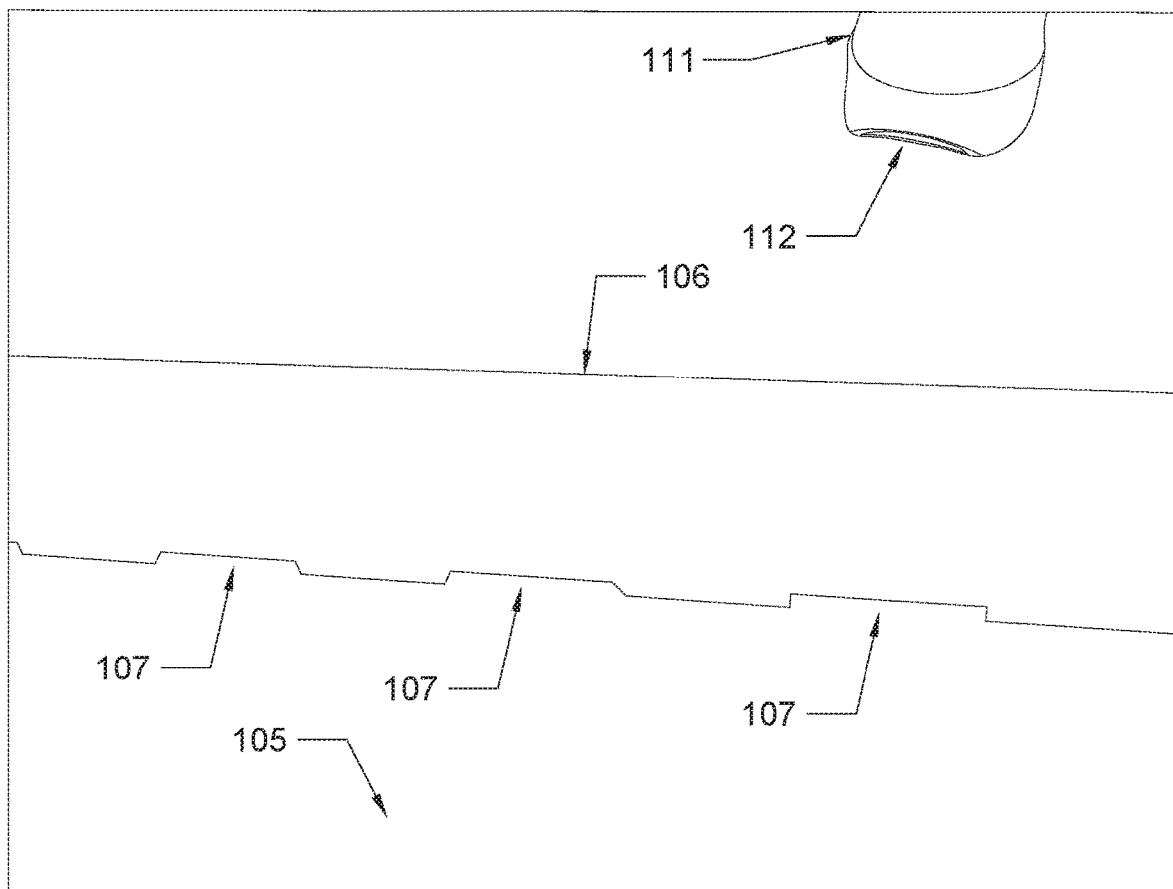
FIG. 5 is a schematic top perspective view of a fluid channel device on the bottom portion inside the cooling tower.

As shown in FIG. 4 and FIG. 14, vent 199 is fluidly connected to a drain 121 and the drain 121 is attached to the bottom portion 105 of the cooling tower 100 and is in fluid connection with the collected fluid in order to remove and/or drain the collected fluid from the bottom portion 105 of the cooling tower 100 at any desired time. The top of the vent 199 is covered and the vent 199 is a one-way flow vent with at least one hole therein which allows collected fluid to be released to the drain 121. The vent 199 can be of a type of studor vent.

The circulating pump 113 is a seal less magnetically drive pump and also is a variable frequency drive (VFD) pump. The circulating pump 113 can operate in the range of one to two amps, or more than two amps if needed, which decreases operating costs and still meet the cooling systems load requirement due to using less power than convention cooling systems. All of the inner surfaces of the fluid passages through which the collected fluid flows through the circulating pump 113 is not metal in order to solve the problem of calcium, alkaline earth metals and/or other metals forming on the surface of the fluid passages. Therefore, all of the inner surfaces of the fluid passages in the circulating pump 113 which the collected fluid flows through are made of a non-porous material such as high-density polyethylene (HDPE) because HDPE resists mold, mildew and well as prevents calcination and the formation of metal deposits. However, the circulating pumps can be any pump which has inner surfaces of the fluid passages in the circulating pump being made of a non-porous material such as high-density polyethylene (HDPE).

Since the cooling tower fan 102 is a motorized impeller variable frequency drive (VFD) fan, the at least one cooling fan 122 is a motorized impeller variable frequency drive (VFD) fan and the circulating pump 113 is a variable frequency drive (VFD) pump, the cooling tower fan 102, the at least one cooling fan 122 and the circulating pump 113 can be operated in conjunction with each other and at low speeds and low amperage in order to satisfy the requirements of the cooling capacity given an outside air temperature in order to increase the cooling towers and cooling systems efficiency because operating the cooling tower fan 102, and/or the at least one cooling fan 122 and/or the circulating pump 113 at low speeds lowers air velocity and fluid pump flow and therefore increases the time (i.e. dwell time) the air and fluid are within the heat exchanges which increases the heat transfer effectiveness significantly while reducing the electric power to the cooling tower fan 102, the at least one cooling fan 122 and/or the circulating pump 113.

Additionally, as shown in FIGS. 3-8, the present invention attaches non-porous boards 103 on the front and back sides of the indirect heat exchanger pads 101 at both the upper and lower ends of the indirect heat exchanger pads 101. Non-porous supports 104 are attached to walls of the cooling tower 100 such that the non-porous boards 103, which are attached at the lower ends of the indirect heat exchanger pads 101, are supported by the non-porous supports 104. For example, the non-porous supports 104 have a groove and the non-porous boards are located within the grooves 126 of the non-porous supports 104 such that a space is formed between the bottom surface of the indirect heat exchanger pads 101 and the bottom portion 105 of the cooling tower 100. The non-porous boards 103 are removably fastened to the indirect heat exchanger pads 101 for the purpose of being able to easily remove the indirect heat exchanger pads 101 from the cooling tower 100 in order to perform cleaning and/or maintenance or to replace the indirect heat exchanger pads 101. The non-porous supports 104 and non-porous boards 103 are made from and/or comprise high-density polyethylene. Furthermore, the non-porous boards 103 can be rectangular shaped, any other geometrical or polygonal shape and/or can have any aerodynamic shape in order create a smooth or laminar flow to any air contacting the non-porous boards 103.

As shown in FIG. 14, a door panel 145 is located on one side and/or on a bottom of the cooling tower 100 in order to easily access the circulating pump 113 or pumps and/or any other apparatus.

Figure 7:
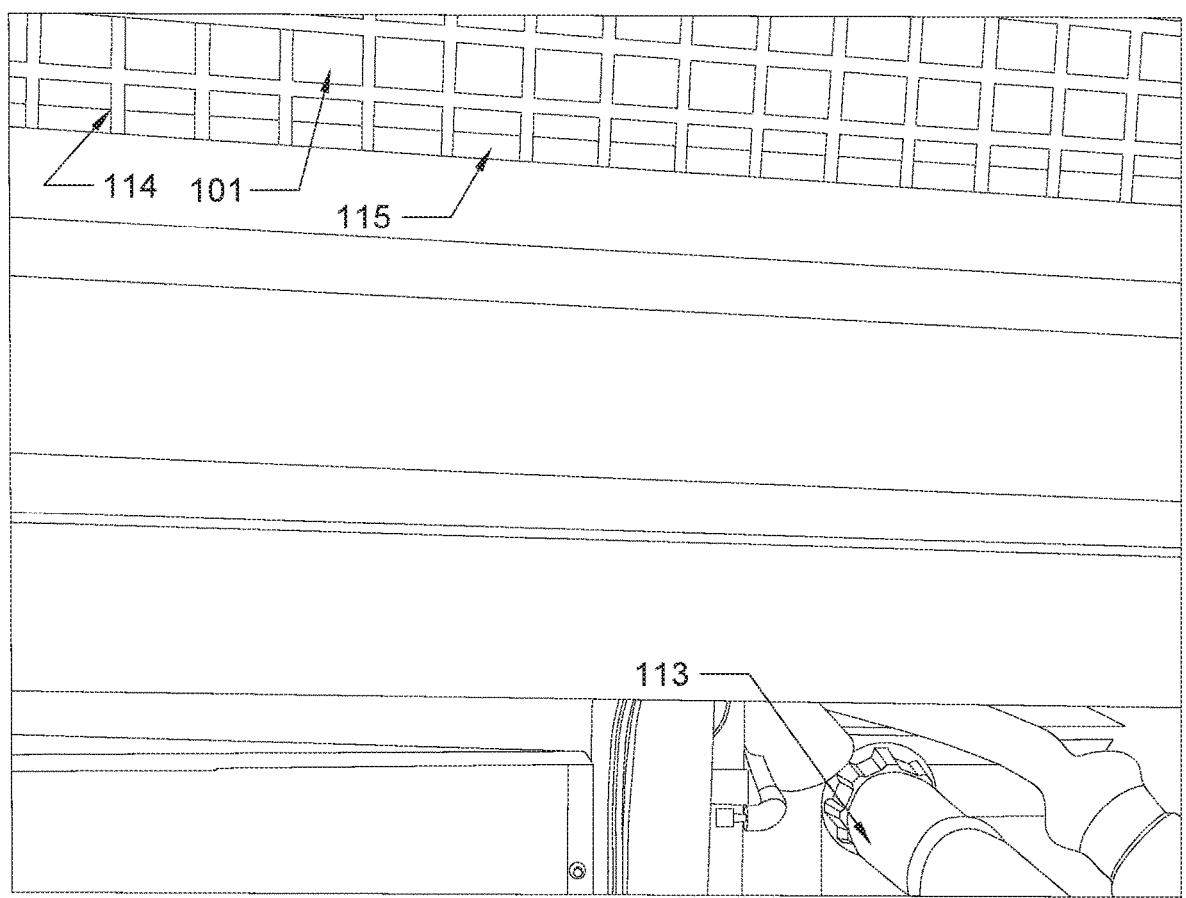
FIG. 7 is a schematic perspective view of a grate attached to the outside surface of the cooling tower.
Figure 13:
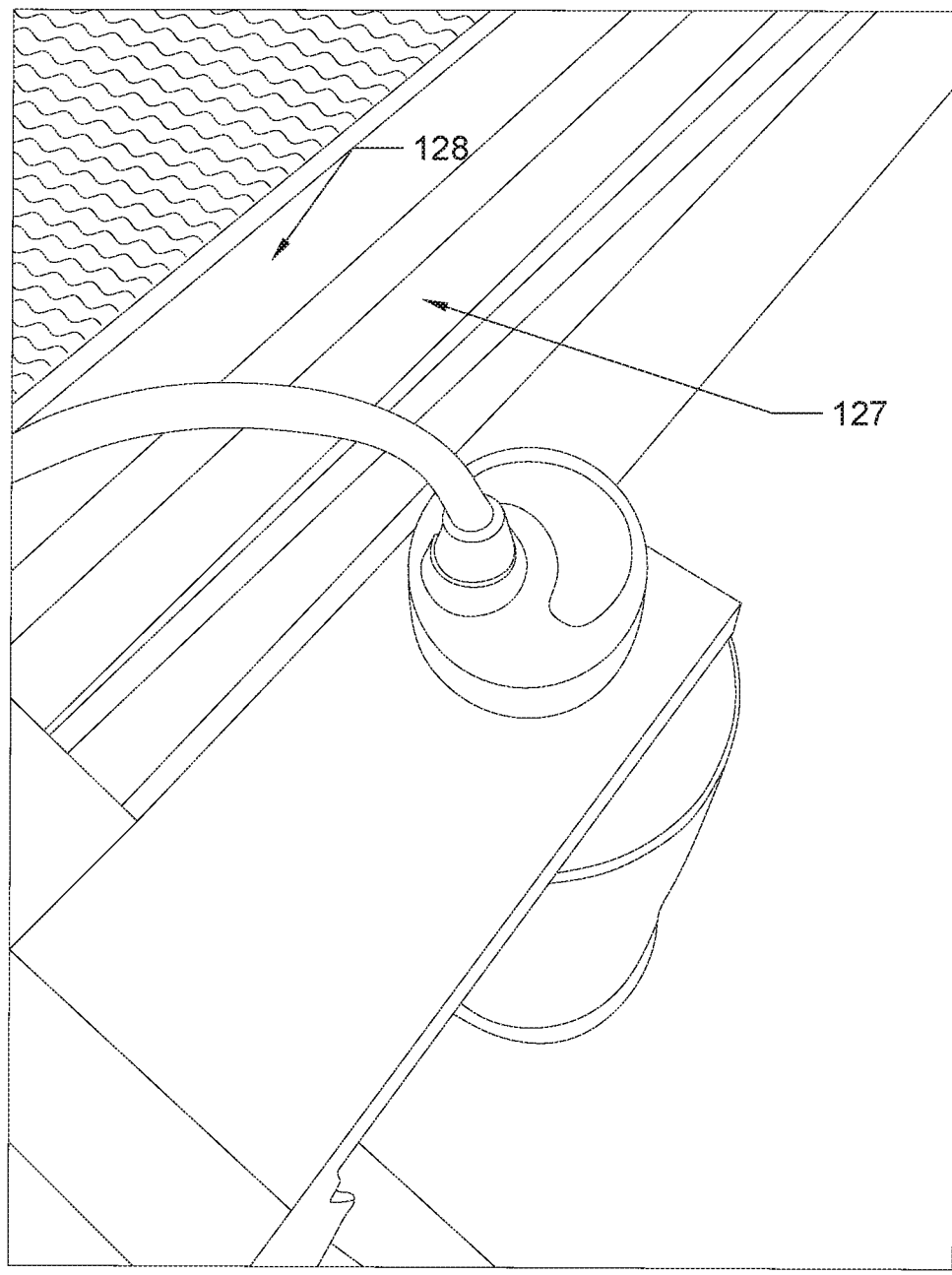
FIG. 13 is a top perspective view of a lower supporting apparatus.

As shown in FIG. 7 and FIG. 13, a lower supporting apparatus 115 is attached to the outer surface of the indirect heat exchanger pads 101 which solves the problem of preventing the fluid which has flowed over the outer surfaces of the indirect heat exchanger pads 101 from splashing or flowing out from the cooling tower 100, which reduces the loss and use of water in the cooling system. The lower supporting apparatus 115 comprises a non-porous backboard 127 and a non-porous drain board 128, where the non-porous drain board 128 makes an angle in the range of five to twenty-two degrees with a horizontal line (i.e. a flat/non-vertical line such as the x-axis in the conventional x-y coordinate system).

As shown in FIG. 7, a filter or grate 114 is attached to an outer surface of the cooling tower 100. A distance between an inner surface of the filter or grate 114 and a surface of the indirect heat exchanger pad 101 is in the range of four to six inches. The distance between the inner surface of the filter or grate 114 is critical because the distance solves two interconnected problems. First, the distance solves the prevention of calcination or the prevention of other metals collecting on the surface of the indirect heat exchanger pads 101 by having ambient or outside side flowing uniformly (i.e. the second solved problem) through the entire surface area of the indirect heat exchanger pads 101.

Figure 16:
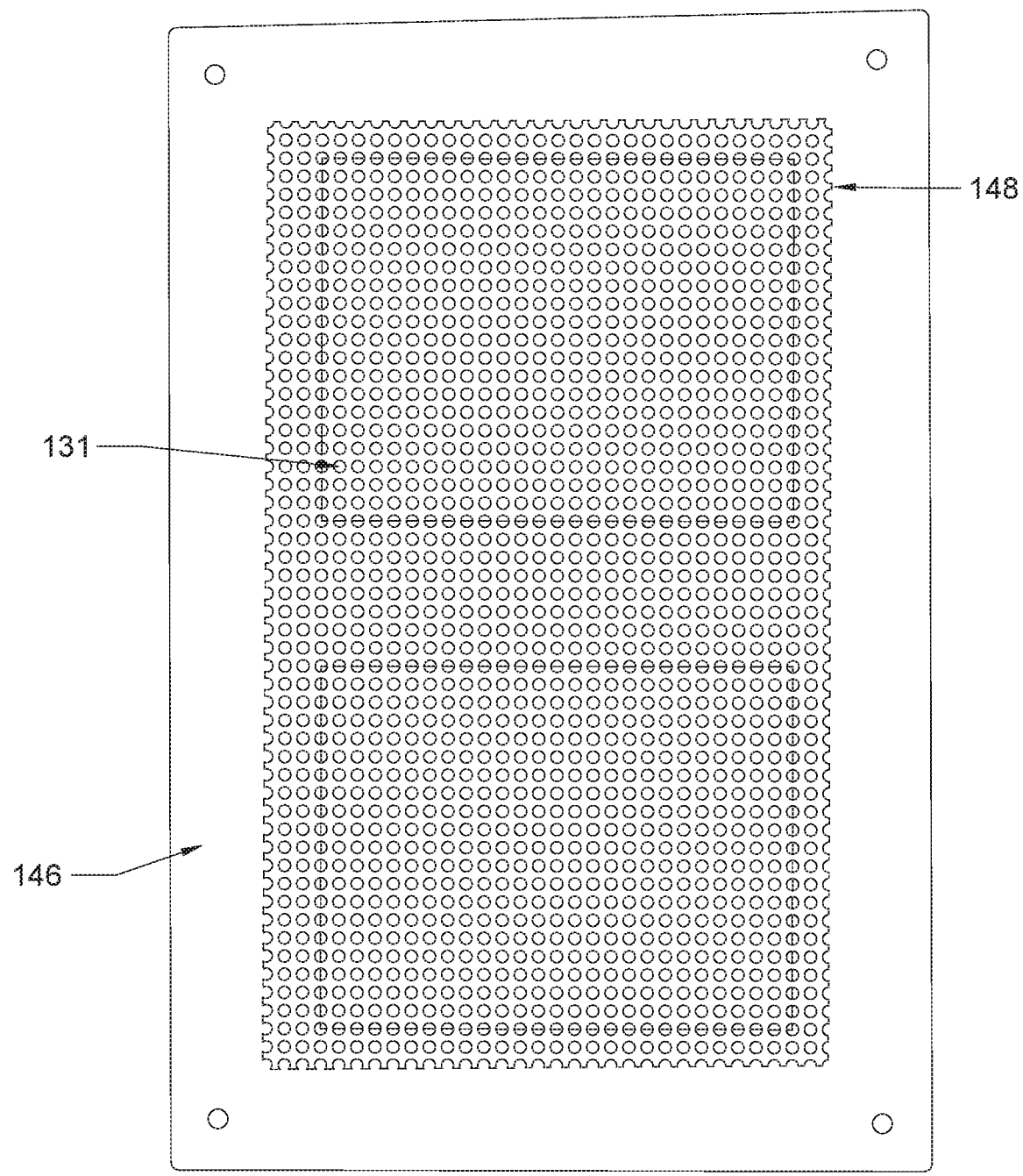
FIG. 16 is a top view of the distribution apparatus and a distribution plate.

As shown in FIG. 14 and FIG. 16, at a top portion of the indirect heat exchanger pads 101, a distribution apparatus 130 is position above the top portion of the indirect heat exchanger pads 101 and a fluid line is fluidly connected to the distribution apparatus 130 and pressurized by the circulating pump 113. The fluid line is fluidly connected to the distribution apparatus 130 from inside the cooling tower 100, so the fluid is not in direct contact with the sun and is prevented from being heated by the direct rays or other hot elements from outside of the cooling tower 100. The distribution apparatus 130 has a plurality of holes 131 in a distribution plate 148 and the plurality of distribution holes 131 are arranged in a staggered arrangement or random arrangement so as to evenly allow the pressurized fluid to flow through the plurality of distribution holes 131 onto the outer surface of the indirect heat exchanger pads 101. Further, the distribution apparatus 130 has distribution apparatus inlet 132. However, the distribution apparatus 130 can have an open bottom portion 146 comprising a plurality of distribution holes 131 therein, therefore the distribution plate is not needed, and the plurality of distribution holes 131 are arranged in a staggered arrangement or random arrangement so as to evenly allow the pressurized fluid to flow through the plurality of distribution holes 131 onto the outer surface of the indirect heat exchanger pads 101.

The distribution apparatus 130 is in the same shape as the top portion of the at least one indirect heat exchanger pad 101 in order to fully coat all surfaces of the indirect heat exchanger pads 101 with a fluid. Therefore, the distribution apparatus 130 is in the general shape of a rectangle where the sides and top of the distribution apparatus 130 form a fluid tight apparatus and the bottom portion 146 of the distribution apparatus 130 allows a fluid to pass therethrough. At least one side of the distribution apparatus 130 has a fluid inlet 132 for the fluid pumped via the circulating pump(s) 113 to enter the distribution apparatus 130. Therefore, the top and all sides of the distribution apparatus 130, except for the portion of the side which has the fluid inlet 132, do not allow passage of a fluid (i.e. are closed to atmospheric air).

By having the fluid being introduced into the distribution apparatus 130 under pressure (i.e. more than atmospheric pressure) by the circulating pump 113, as opposed to having the fluid operating under atmospheric pressure solves the problem of being able to either increase or decrease the flow rate over the outer surfaces of the indirect heat exchanger pads 101. Furthermore, since the fluid is pressurized by the circulating pump(s) 113, this has allowed Applicant to create distribution hole 131 sizes within the distribution apparatus 130 such that the fluid level within the distribution apparatus 130 stays at a constant level and/or maintains a level such that the outer surfaces of the indirect heat exchanger pads 101 are always fully coated or saturated during use. The distribution holes 131 can be round, circular or any geometric or polygon shape. The size of the distribution holes 131 can have a diameter of one sixteenth of an inch to four inches. However, the distribution hole 131 diameters can be smaller and/or larger than one sixteenth of an inch or four inches. When the opening of the distribution holes 131 is not circular in shape, then the distribution holes 131 opening can be one sixteenth of an inch to four inches or can be larger or smaller than one sixteenth of an inch or four inches. The distribution holes 131 may all have the same size or may have different sizes in order to create distribution hole 131 sizes within the distribution apparatus 130 such that the fluid level within the distribution apparatus 130 stays at a constant level and/or maintains a level such that the outer surfaces of the indirect heat exchanger pads 101 are always fully coated or saturated during use.

As shown in FIG. 4, FIG. 5, FIG. 6 and FIG. 10, an ultrasonic sensor and relay 109 are located above the bottom portion 105 of the cooling tower 100, attached to a non-porous device 110 and are inserted within a protective container 111. The ultrasonic sensor and relay 109 senses and determine the collect fluid level within the bottom portion 105 of the cooling tower 100 and send signals to a relay in the cooling system and to a fill valve 120 and/or chilled water valve 133, which is fluidly connected to the primary indirect heat exchanger 138, such as a heat exchanger coil. The ultrasonic sensor and relay 109 send signals to the fill valve 120 and/or chilled water valve 133 such that the fill valve 120 and/or chilled water valve 133 operates such in a manner to add small amounts of water into the bottom portion 105 of the cooling tower 100, keeping the temperature of the collect fluid level within the bottom portion 105 of the cooling tower 100 at a constant temperature by not letting the collect fluid level within the bottom portion 105 of the cooling tower 100 become below a determine level. The addition of water in small amounts does not change the temperature of the collected fluid and solves the problem of increasing the temperature of the collected water by adding a large volume of water to the collect fluid level within the bottom portion 105 of the cooling tower 100 which does and will increase the temperature of the collected fluid and therefore reduces the cooling efficiency of the cooling tower 100 and the cooling system.

Figure 6:
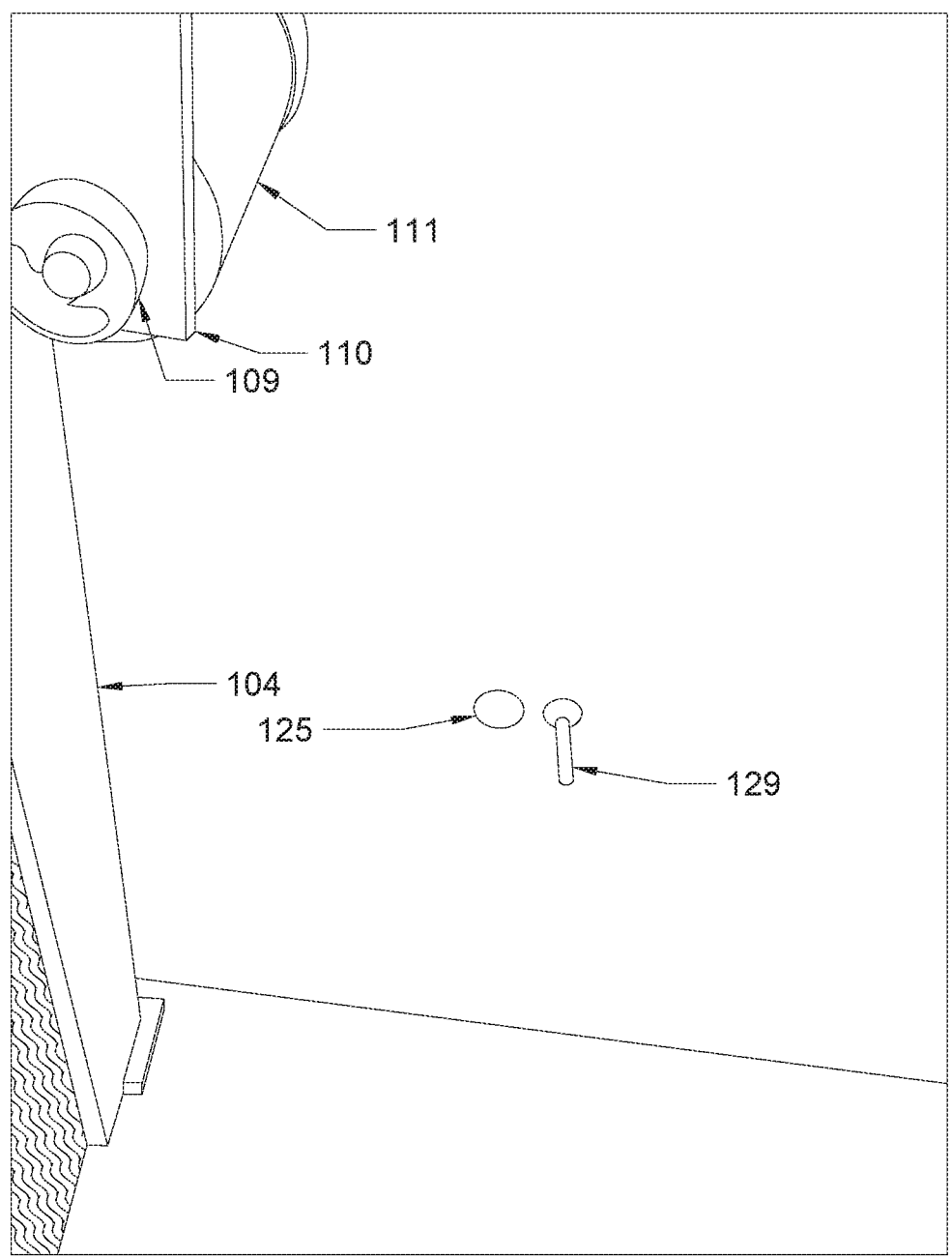
FIG. 6 is a schematic top perspective view of an ultrasonic sensor and relay inside the cooling tower.

As shown in FIG. 6, the non-porous device 110 is attached to an inner wall of the cooling tower 100. The protective container 111 is placed on the bottom portion 105 of the cooling tower 100 and has a flow passage 112 located at a lower part of the protective container 111 in order to allow the collected fluid to flow into and out of the flow passage 112. The ultrasonic sensor and relay 109 are inserted in (i.e. located within) the protective container 111.

Figure 8:
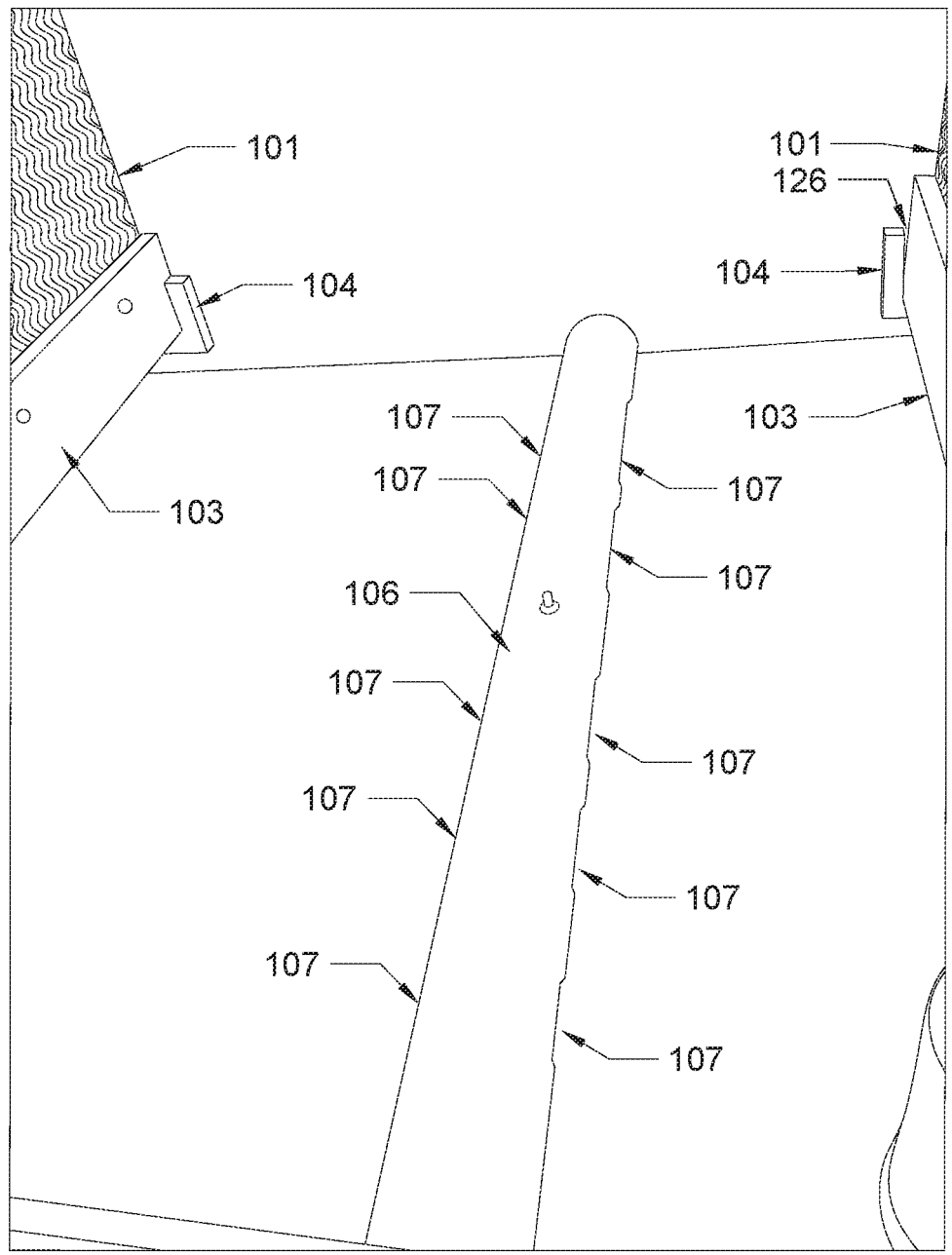
FIG. 8 is a schematic top perspective view illustrating the fluid channel device in a middle section of the bottom portion inside the cooling tower.

As shown in FIG. 8, a fluid channel device 106 is located on the bottom portion 105 of the cooling tower 100 and is connected to the bottom portion 105 of the cooling tower 100 via a fastener or fasteners 129. The fluid channel device 106 is positioned on the bottom portion 105 of the cooling tower 100 such that the opening 125 in the middle section of the bottom portion 105 of the cooling tower 100 is covered by the fluid channel device 106. Additionally, the fluid channel device 106 has a plurality of channels 107 spaced along the length of the fluid channel device 106. The channels 107 may have an elongated shape, a circular shape or any geometric or polygonal shape such that the collected fluid flows into the plurality of channels 107. The shape of the channels 107 is designed such that the height of the channels 107 allows the coldest lower level portion of the collected fluid to flow therethrough and is designed such that when the circulating pump 113 is operating at maximum power and flow rate, the collected fluid flows through the plurality of channels 107 at a flow rate such that the indirect heat exchanger pads 101 are being maintained fully saturated (i.e. the outside surface of the indirect heat exchanger pads 101 are not devoid of a fluid) when the cooling tower 100 and system are operational.

Figure 9:
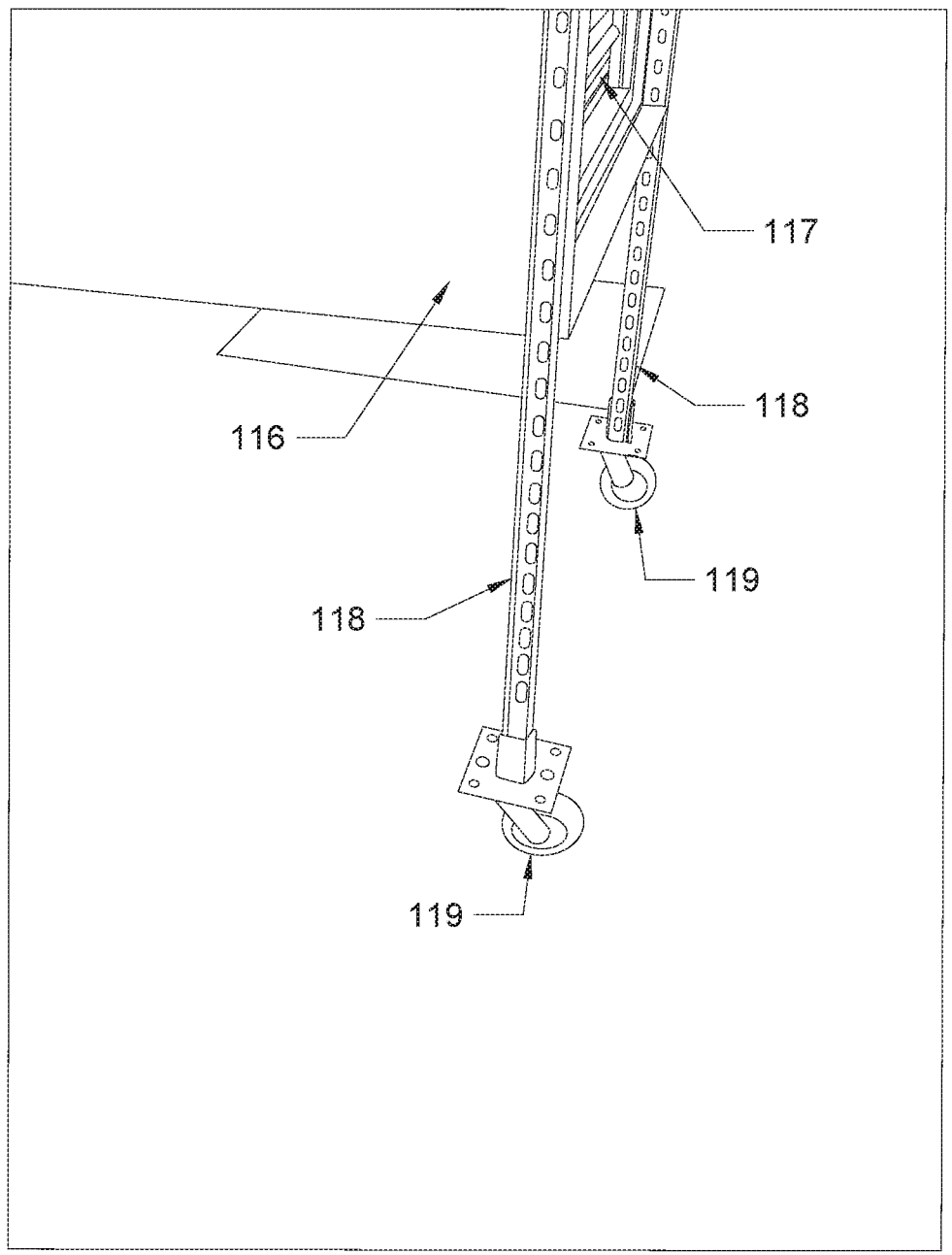
FIG. 9 is a schematic side perspective view of an inlet apparatus.
Figure 10:
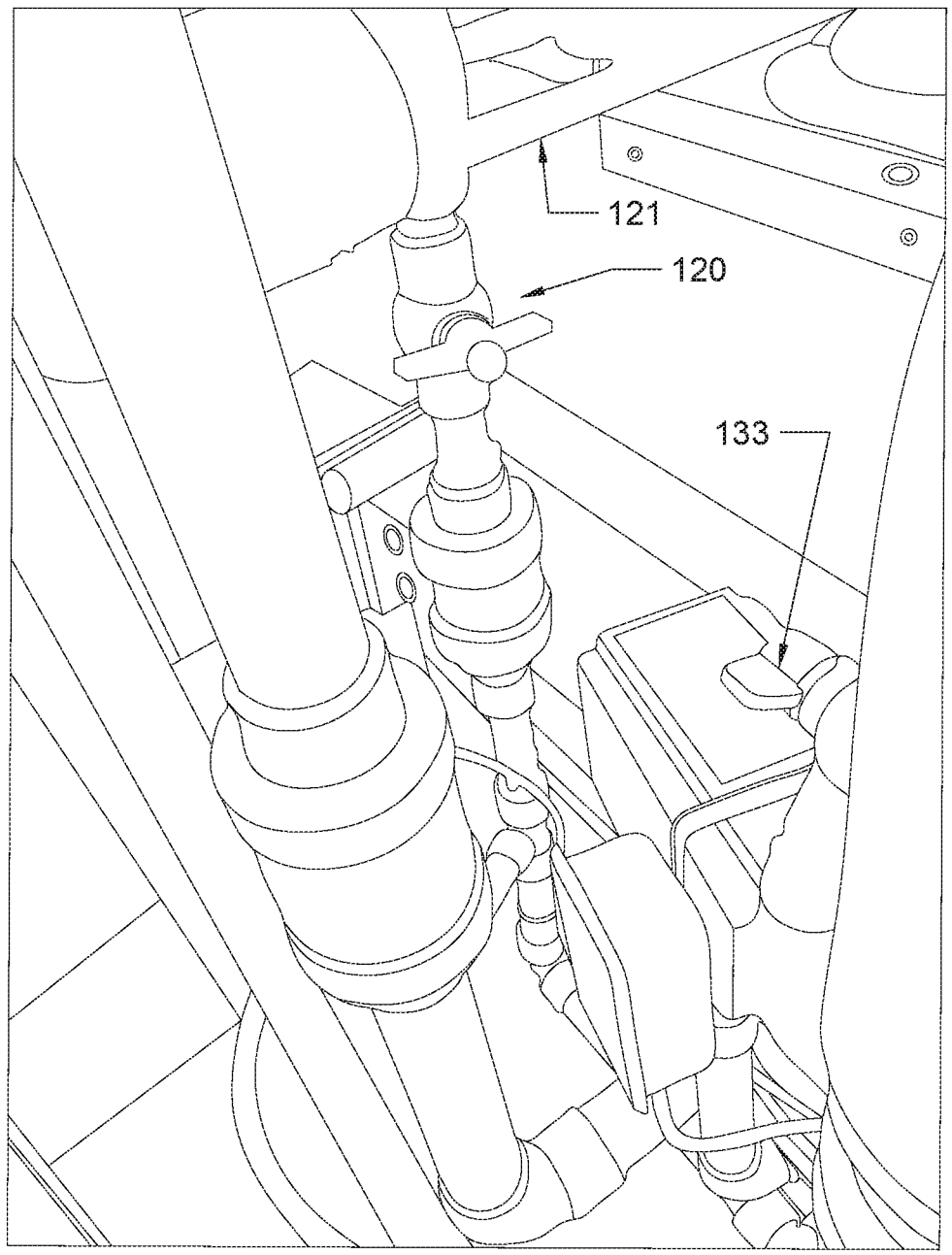
FIG. 10 is a top perspective view of a fill vale and heat exchanger coil.
Figure 11:
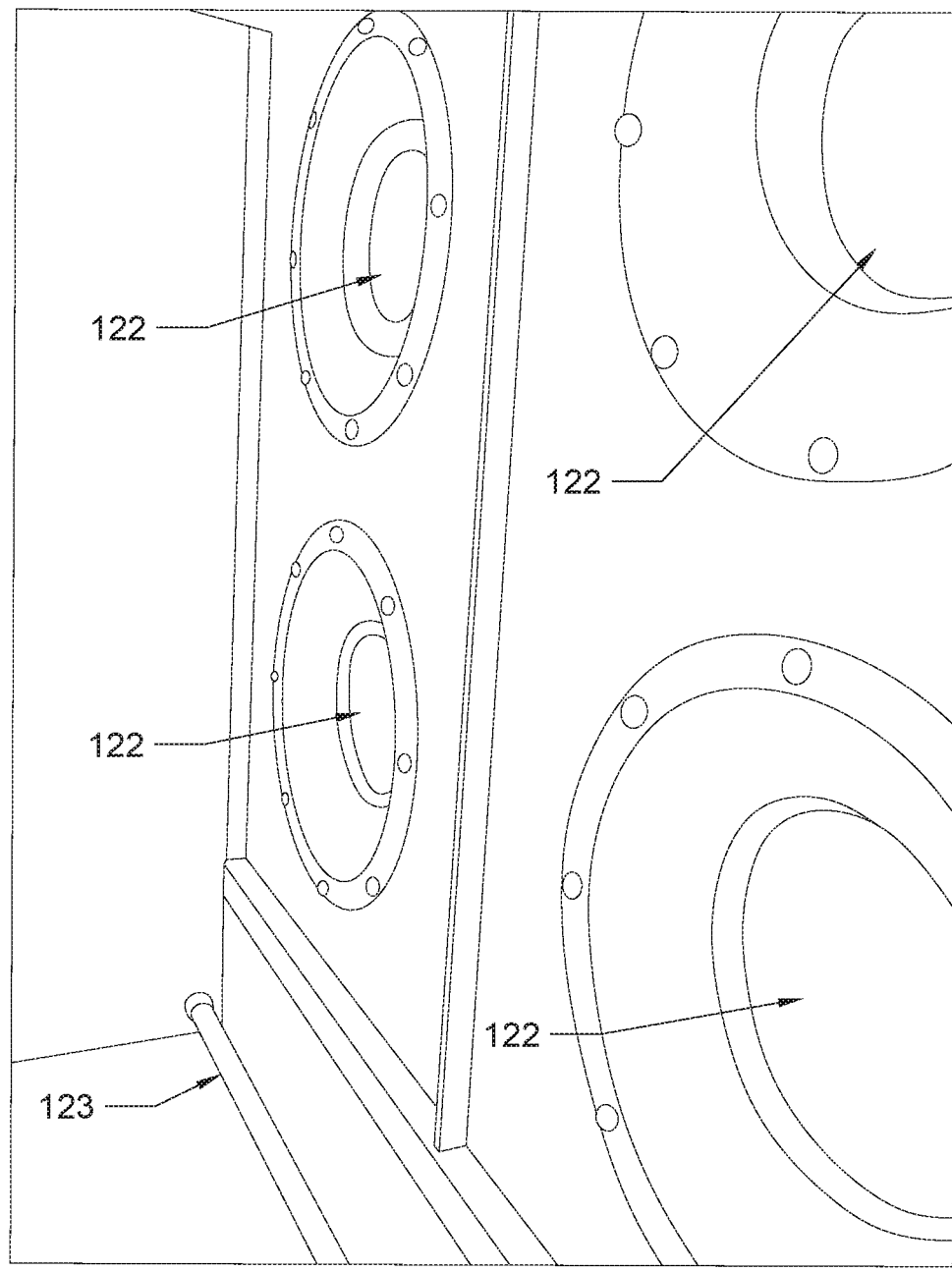
FIG. 11 is a schematic side perspective view of cooling fans.
Figure 15:
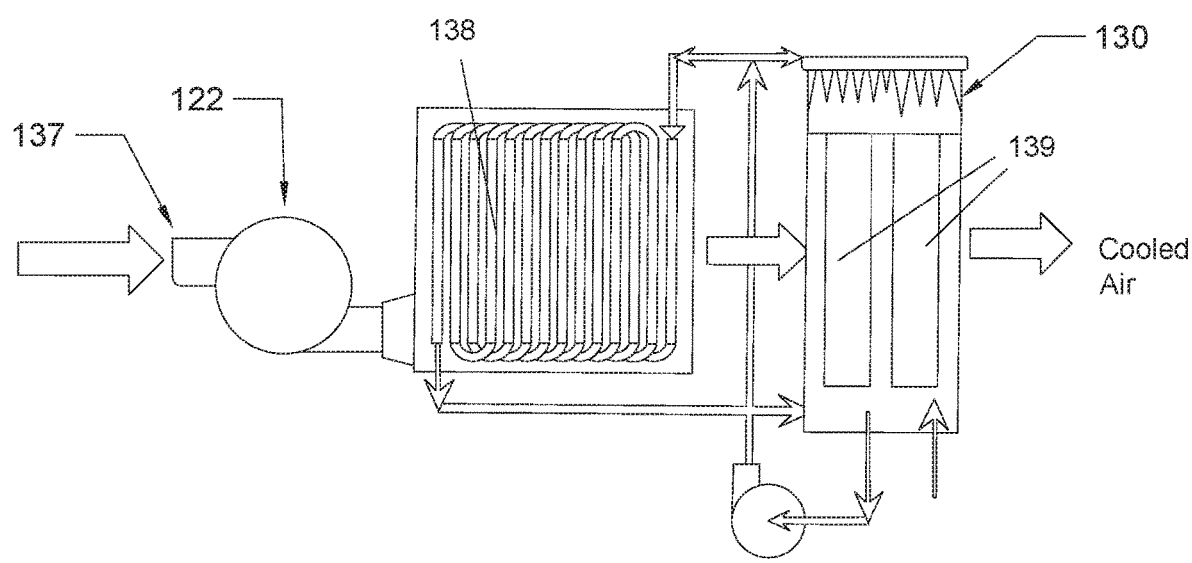
FIG. 15 is a schematic view of ambient air pulled through an inlet and indirect and direct heat exchanger by via cooling fans.

As shown in FIG. 10 and FIG. 15, where the system of FIG. 15 can be attached to an outer surface of the cooling tower 100, ambient air or outside air is pulled into an air intake 137 by using variable frequency drive (VFD) fans 122 and the ambient air or outside air then flows through a primary air indirect heat exchanger 138, then through a direct heat exchanger 139 such as coiled heat exchanger where the ambient air or outside air, has now cooled from the indirect and direct heat exchangers and then this cooled air flows to the desired space which is to be cooled. As shown in FIG. 9, any ambient air inlet 116 can comprise louvers 117 and/or movable supports 118 such that the inlet can be moved using wheels 119 in order to perform maintenance.

Figure 17:
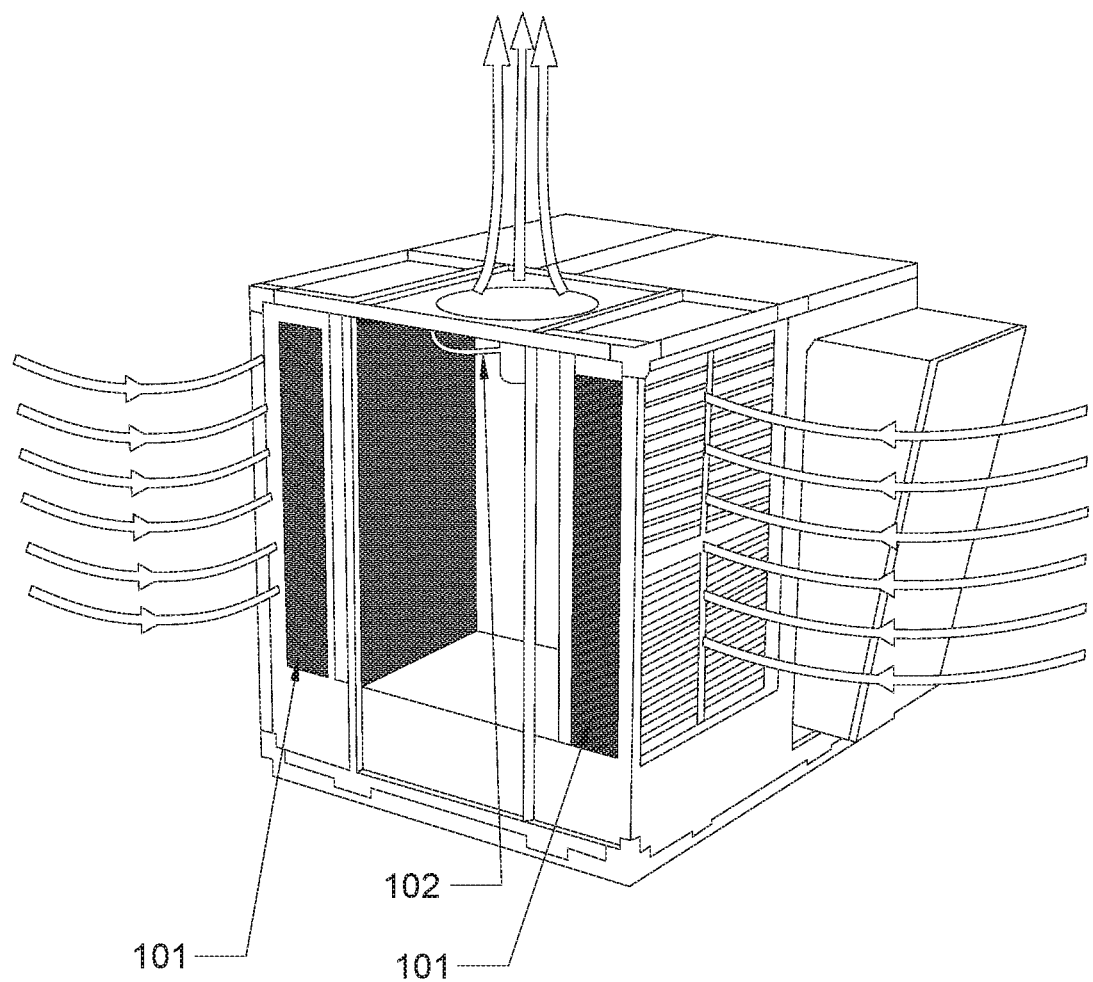
FIG. 17 is a front perspective view of the indirect-direct evaporative cooling (IDEC) system.
Figure 18:
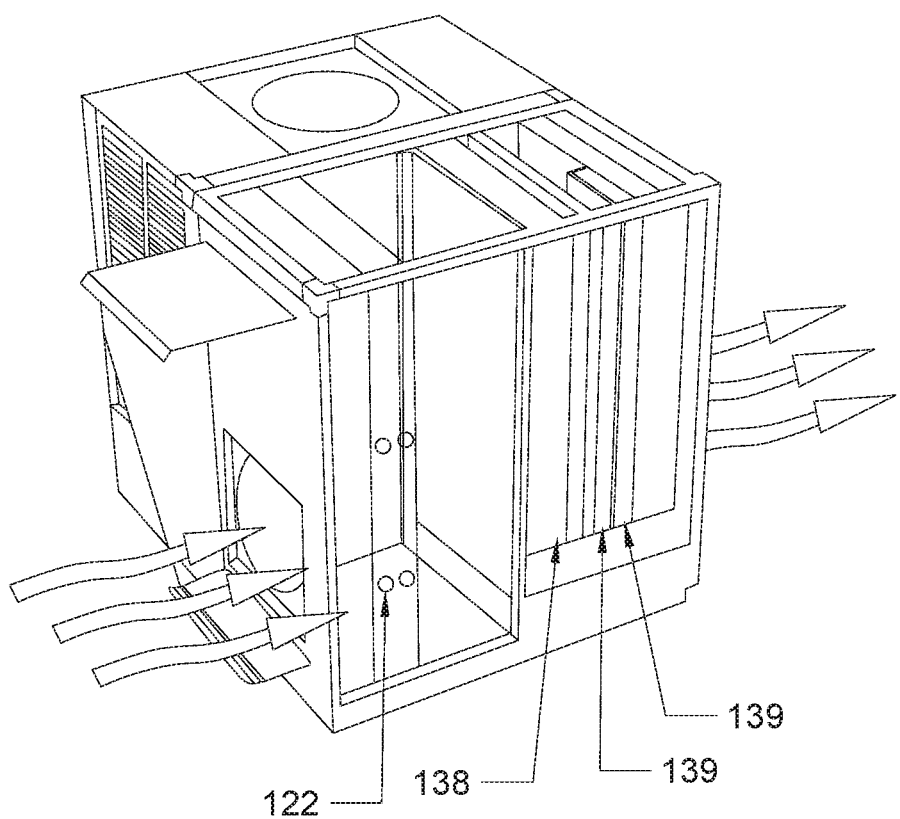
FIG. 18 is a back perspective view of the indirect-direct evaporative cooling (IDEC) system.

Also, as shown in FIG. 17 and FIG. 18, the evaporative cooling system has ambient air or outside air being pulled into an air inlet/inlet apparatus by using variable frequency drive (VFD) cooling fans 122 and the ambient air or outside air then flows through a primary air indirect heat exchanger 138, then through direct heat exchanger(s) 139 where the ambient air or outside air, has now cooled from the indirect 138 and direct 139 heat exchangers and then this cooled air flows to the desired space which is to be cooled.

All of the disclosed elements, devices and apparatus within the inside and/or inner surface of the cooling tower 100, except for the surfaces of the indirect heat exchanger pads 101, are made from and/or coated with a non-porous material such as HDPE and not made from metal. Furthermore, insulation such as blown type of insulation is contained between the inner and outer walls which make up the cooling tower 100 in order to insulate any and all fluids within (i.e. inside) the cooling tower 100 from the sun's rays and hot fluids external of the cooling tower 100, which further increases the cooling efficiency of the cooling tower 100.

What is claimed is:
1. A cooling tower comprising:
   a front side,
   a top which has an aperture,
   a bottom portion,
   indirect heat exchanger pads, where an indirect heat exchanger pad is located on a left and a right side of the cooling tower, and
   a back side which is opposite the front side,
   wherein all inside surfaces of the cooling tower, except for surfaces of the indirect heat exchanger pads, are made from and/or comprise high-density polyethylene (HDPE).

2. The cooling tower according to claim 1, further comprising a distribution apparatus wherein the distribution apparatus is positioned above a top portion of the indirect heat exchanger pads and a fluid line is fluidly connected to the distribution apparatus and pressurizes cooling fluid by a circulating pump.

3. The cooling tower according to claim 2, wherein the distribution apparatus comprises a plurality of holes arranged in a staggered arrangement or random arrangement so as to evenly allow the cooling fluid to flow through the plurality of holes onto an outer surface of the indirect heat exchanger pads.

4. The cooling tower according to claim 1, further comprising a cooling fan wherein the cooling fan is located within the cooling tower.

5. The cooling tower according to claim 1, further comprising an ultrasonic sensor and relay wherein the ultrasonic sensor and relay are located above the bottom portion of the cooling tower.

6. The cooling tower according to claim 5, wherein the ultrasonic sensor and relay are contained in a protective container.

7. The cooling tower according to claim 6, wherein the ultrasonic sensor and relay sense and determine a collect fluid level within the bottom portion of the cooling tower and send signals to a relay in the cooling system and to a fill valve and/or a chilled water valve.

8. The cooling tower according to claim 1, further comprising a filter or grate wherein the filter or grate is attached to an outer surface of the cooling tower.

9. The cooling tower according to claim 8, wherein an inner surface of the filter or grate and a surface of the indirect heat exchanger pad are separated by a distance having a range of four to six inches.

10. The cooling tower according to claim 1, further comprising non-porous boards attached on front and back sides of the indirect heat exchanger pads at both upper and lower ends of the indirect heat exchanger pads.

11. The cooling tower according to claim 10, wherein non-porous supports are attached to walls of the cooling tower such that the non-porous boards are supported by the non-porous supports.

12. The cooling tower according to claim 11, wherein the non-porous supports have a groove and the non-porous boards are located within the grooves of the non-porous supports such that a space is formed between a bottom surface of the indirect heat exchanger pads and the bottom portion of the cooling tower.

13. The cooling tower according to claim 11, wherein the non-porous boards are removably fastened to the indirect heat exchanger pads.

14. The cooling tower according to claim 11, wherein the non-porous supports and non-porous boards are made from and/or comprise high-density polyethylene.

15. The cooling tower according to claim 1, further comprising a non-porous device attached to an inner wall of the cooling tower.

16. The cooling tower according to claim 1, further comprising a protective container wherein the protective container is placed on the bottom portion of the cooling tower and has a flow passage which is located at a lower part of the protective container in order to allow collected fluid to flow into and out of the flow passage.

17. The cooling tower according to claim 1, further comprising a fluid channel device located on the bottom portion of the cooling tower and connected to the bottom portion of the cooling tower with a fastener.

18. The cooling tower according to claim 1, further comprising an opening in a middle section of the bottom portion of the cooling tower wherein the opening is covered by a fluid channel device.

19. The cooling tower according to claim 18, wherein the fluid channel device has a plurality of channels spaced along a length of the fluid channel device.

\* \* \* \* \*